US012533583B2

(12) United States Patent
Kando

(10) Patent No.: US 12,533,583 B2
(45) Date of Patent: Jan. 27, 2026

(54) COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Yuji Kando, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 407 days.

(21) Appl. No.: 18/344,038

(22) Filed: Jun. 29, 2023

(65) Prior Publication Data

US 2024/0001232 A1 Jan. 4, 2024

(30) Foreign Application Priority Data

Jul. 4, 2022 (JP) ................................ 2022-107688

(51) Int. Cl.
*A63F 13/52* (2014.01)

(52) U.S. Cl.
CPC .................................. *A63F 13/52* (2014.09)

(58) Field of Classification Search
CPC ...... A63F 13/52; A63F 13/426; A63F 13/537; A63F 13/2145
USPC ........................................................... 463/31
See application file for complete search history.

(56) References Cited

U.S. PATENT DOCUMENTS

| | | | | |
|---|---|---|---|---|
| 6,402,619 | B1 | 6/2002 | Sato | |
| 11,989,394 | B2 * | 5/2024 | Pope | A63F 13/537 |
| 2006/0189385 | A1 | 8/2006 | Nakajima et al. | |
| 2011/0102469 | A1 * | 5/2011 | Kami | A63F 13/52 345/682 |
| 2019/0111344 | A1 * | 4/2019 | Hiroki | A63F 13/833 |
| 2020/0368608 | A1 | 11/2020 | Kando et al. | |
| 2024/0264727 | A1 * | 8/2024 | Pope | A63F 13/537 |

FOREIGN PATENT DOCUMENTS

| | | |
|---|---|---|
| JP | 2000-237447 | 9/2000 |
| JP | 2006-230587 | 9/2006 |
| JP | 2020-054502 | 4/2020 |
| JP | 2020-188985 | 11/2020 |

OTHER PUBLICATIONS

Nintendo Co., Ltd. "Pikmin 3 Deluxe", [online] searched on Jun. 22, 2022, internet, (URL https://www.nintendo.com/store/products/pikmin-3-deluxe-switch/) , 5 pages.

* cited by examiner

*Primary Examiner* — Pierre E Elisca
(74) *Attorney, Agent, or Firm* — Nixon & Vanderhye PC

(57) ABSTRACT

It is detected that a first input operation has been performed by a user. An event occurrence process of causing an event to occur each time the first input operation is performed once is performed. A parameter change process of changing a parameter each time the event occurs is performed. A display image including an image corresponding to the parameter is generated. When the first input operation is repeatedly performed a plurality of times by the user, if the parameter becomes included in a reference range, the event occurrence process is temporarily stopped and then restarted.

17 Claims, 32 Drawing Sheets

FIG. 24

303

| SUPPORTER TYPE INFORMATION (331) | WORK POWER INFORMATION (332) | APPEARANCE DATA (333) |
|---|---|---|
| RED SUPPORTER | 1 | ... |
| BLUE SUPPORTER | 1 | ... |
| YELLOW SUPPORTER | 1 | ... |
| WHITE SUPPORTER | 10 | ... |

FIG. 25

304

| SUPPORTER ID (341) | SUPPORTER TYPE INFORMATION (342) | SUPPORTER POSITION AND ORIENTATION INFORMATION (343) | AFFILIATION STATE (344) | SUPPORTER ACTION STATE (345) | ACTION PARAMETER (346) |
|---|---|---|---|---|---|
| P0001 | RED SUPPORTER | ... | NOT BELONGING | WAITING | ... |
| P0002 | RED SUPPORTER | ... | PC | WORKING | ... |
| P0003 | BLUE SUPPORTER | ... | PC | WORK WAITING | ... |
| ⋮ | ⋮ | ⋮ | ⋮ | ⋮ | ⋮ |

FIG. 26

305

| 351 WORK TARGET ID | 352 FIRST CLASSIFICATION INFORMATION | 353 REQUIRED WORK POWER INFORMATION | 354 OPERATING POWER INFORMATION | 355 WAITING POWER INFORMATION | 356 STOPPER INVALIDITY FLAG | 357 SECOND CLASSIFICATION INFORMATION | 358 WORKABLE TYPE INFORMATION | 359 WORK TARGET POSITION AND ORIENTATION INFORMATION | 360 APPEARANCE DATA |
|---|---|---|---|---|---|---|---|---|---|
| S001 | REQUIRED POWER SET TYPE | 20 | 0 | 0 | OFF | TYPE-UNLIMITED TYPE | Null | .... | .... |
| S002 | REQUIRED POWER SET TYPE | 1 | 0 | 0 | ON | TYPE-UNLIMITED TYPE | Null | .... | .... |
| S003 | REQUIRED POWER NON-SET TYPE | Null | Null | Null | Null | TYPE-LIMITED TYPE | YELLOW SUPPORTER | .... | .... |
| S004 | REQUIRED POWER NON-SET TYPE | Null | Null | Null | Null | TYPE-UNLIMITED TYPE | Null | .... | .... |
| ... | ... | ... | ... | ... | ... | ... | ... | ... | ... |

COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2022-107688 filed on Jul. 4, 2022, the entire contents of which are incorporated herein by reference.

FIELD

The present disclosure relates to control of game processing when a certain input operation is repeatedly performed.

BACKGROUND AND SUMMARY

Conventionally, a game in which it is possible to perform an operation for throwing a first object has been known. In this game, there is an event object for which a condition required for a predetermined event to occur is defined. The required condition is satisfied by throwing a plurality of first objects to the event object. In this case, it is considered that, for an event object that requires 20 first objects, a user performs an operation of repeatedly pressing a button assigned to a throwing operation. By this repeated pressing operation, first objects are continuously thrown one by one, so that the above required condition is gradually satisfied.

In the above game, when the above-described repeated pressing operation is performed, if the repeated pressing operation is continued even after the number of thrown first objects reaches the number required for the event to occur, the throwing of first objects is continued. That is, by performing the repeated pressing operation, first objects whose number is more than the required number may be thrown. In other words, in the repeated pressing operation, it is difficult to stop the operation immediately when the button is pressed the above required number of times. Therefore, there is room for improvement in the operability for such repeated pressing.

Therefore, an object of the present disclosure is to provide a computer-readable non-transitory storage medium, an information processing apparatus, an information processing system, and an information processing method that can improve operability when repeatedly performing a predetermined input operation.

In order to attain the object described above, for example, the following configuration examples are exemplified.

Configuration 1

Configuration 1 is directed to a computer-readable non-transitory storage medium having stored therein instructions that, when executed by a computer of an information processing apparatus, cause the computer of the information processing apparatus to:

detect that a first input operation has been performed by a user;

perform an event occurrence process of causing an event to occur each time the first input operation is performed once;

perform a parameter change process of changing a parameter each time the event occurs;

generate a display image including an image corresponding to the parameter; and temporarily stop and then restart the event occurrence process if the parameter becomes included in a reference range when the first input operation is repeatedly performed a plurality of times by the user.

According to the above configuration, in a situation in which the first input operation for causing the event to occur with one input is repeatedly performed a plurality of times, if the parameter which changes with occurrence of the event becomes included in the reference range, even when the first input operation continues to be repeated, occurrence of the event can be temporarily stopped. Accordingly, when the first input operation is repeated, for example, by a repeated pressing operation, the parameter can be prevented from changing more than the user intends due to the event occurring more than necessary due to the momentum of the repeated pressing. Therefore, the operability in a repeated input operation such as an operation of repeatedly pressing a button can be improved.

Configuration 2

According to Configuration 2, in Configuration 1 described above, the parameter may be changed such that an amount by which the parameter is changed may be different for each occurrence of the event.

According to the above configuration, since the change amount of the parameter is not constant, the event can be inhibited from being caused to occur more than necessary even in a situation in which it is difficult for the user themselves to count the change amount of the parameter.

Configuration 3

According to Configuration 3, in Configuration 1 or 2 described above, the display image including an index in which a change in the parameter is reflected with a delay may be generated.

According to the above configuration, even if the change in the parameter has not been reflected on the display image yet, when the first input operation by which the parameter can be included in the reference range is performed, occurrence of the event can be temporarily stopped. Therefore, the parameter can be prevented from changing more than the user intends, while an image that gives no uncomfortable feeling is represented to the user as the display image.

Configuration 4

According to Configuration 4, in any one of Configurations 1 to 3 described above, when the first input operation is repeatedly performed a plurality of times by the user, if the parameter becomes included in the reference range, the event occurrence process may be stopped for a certain time and then restarted.

According to the above configuration, when the user does not stop but continues repeated input of the first input operation even after the event occurrence process is temporarily stopped, the event occurrence process is restarted after the certain time elapses. When the user continues repeated input of the first input operation even after occurrence of the event is temporarily stopped, it is also considered that the user intentionally continues the repeated input, so that an operation considering the intention of the user can be achieved by restarting occurrence of the event after the certain time elapses. In addition, the user is provided with a plurality of options such as an option to stop a series of operations of repeating the first input operation and an option to continue the series of operations without stopping the series of operations even though occurrence of the event is temporarily stopped in the middle.

Accordingly, the degree of freedom of operation can be improved.

Configuration 5

According to Configuration 5, in Configuration 4 described above, after the first input operation is performed, when the first input operation is performed again within a time equal to or less than a threshold, it may be determined that the first input operation is repeatedly performed a plurality of times.

According to the above configuration, for example, as for an operation of repeatedly pressing a button, without having the user take time and effort to count the number of times the button is repeatedly pressed, the operability of the user can be improved.

Configuration 6

According to Configuration 6, in any one of Configurations 1 to 5 described above, when the first input operation is repeatedly performed a plurality of times by the user, if the parameter becomes included in the reference range, the event occurrence process may be stopped until the first input operation is no longer repeated, and may then be restarted.

According to the above configuration, the event occurrence process can be stopped until the user stops the repeated input. Accordingly, it can be made easier for the user to notice that the parameter is included in the reference range.

Configuration 7

According to Configuration 7, in any one of Configurations 1 to 6 described above, when the repeat of the first input operation by the user stops while the event occurrence process is temporarily stopped, a time for which the event occurrence process is temporarily stopped may be shortened.

According to the above configuration, the time for which occurrence of the event is temporarily stopped can be shortened. Therefore, when the user wants to intentionally increase the number of times the event occurs, it is made possible to increase the number of times more quickly.

Configuration 8

According to Configuration 8, in any one of Configurations 1 to 7 described above, the instructions may further cause the computer to:

place a target object with which the parameter and the reference range are associated with, in a virtual space; and change a visual state of the target object as the event each time the first input operation is performed.

According to the above configuration, for example, in a game in which a parameter required for transporting a transport body object is set, a situation in which it is easy for the user to visually grasp a change in the parameter due to occurrence of a first event, can be caused to arise. Accordingly, the convenience of the user can be improved.

Configuration 9

According to Configuration 9, in Configuration 8 described above, the event may be caused to occur by causing a player object to perform an action for the target object each time the first input operation is performed, and while the event occurrence process is temporarily stopped, causing the player object to perform the action for the target object in accordance with the first input operation being performed may be temporarily stopped.

According to the above configuration, a situation in which the player object does not respond to a user's input can be created. Accordingly, an uncomfortable feeling can be given to the user, thereby making the user notice that the event occurrence process has been stopped.

Configuration 10

According to Configuration 10, in Configuration 8 described above, the instructions may further cause the computer to:

move a cursor indicating a position in the virtual space, in accordance with a second input operation being performed by the user;

fix the cursor such that the cursor indicates a position of the target object, in accordance with a cursor fixing condition being satisfied; and cause the event to occur at the position in the virtual space indicated by the cursor each time the first input operation is performed.

According to the above configuration, the cursor can be fixed, and the event can be caused to occur at the position indicated by the cursor. Therefore, the need to move the cursor position each time the first input operation is performed is eliminated, so that the operability and the convenience of the user can be improved.

Configuration 11

According to Configuration 11, in Configuration 10 described above, when the cursor is fixed so as to indicate the position of the target object and another target object is present near the target object, if the parameter becomes included in the reference range, the cursor may be fixed so as to indicate a position of the other target object, and the player object may be caused to perform the action for the other target object each time the first input operation is performed, without temporarily stopping the event occurrence process.

According to the above configuration, the target indicated by the cursor can be automatically switched. In this case, when the target indicated by the cursor is frequently switched, the event occurrence process may not necessarily be stopped. Accordingly, in a situation in which the target indicated by the cursor is frequently switched, the event occurrence process can be smoothly and continuously performed, for example, by simply performing repeated pressing, so that the operability can be improved.

Configuration 12

According to Configuration 12, in Configuration 11 described above, the parameter associated with the target object may become included in the reference range in accordance with the event occurring once.

According to the above configuration, in a situation in which target objects for each of which the parameter is included in the reference range by a single first input operation are densely located and the target indicated by the cursor can be switched frequently, the event occurrence process can be smoothly and continuously performed, for example, by simply performing repeated pressing, so that the operability can be improved.

Configuration 13

According to Configuration 13, in Configuration 8 described above, a character object may be placed in the virtual space each time the first input operation is performed by the user, and if the parameter becomes included in the reference range, the target object may be moved by the character object.

According to the above configuration, in a game in which a target object is transported by a plurality of character objects, character objects whose number is larger than the user intends can be prevented from being placed, for example, due to repeatedly pressing a button.

Configuration 14

According to Configuration 14, in Configuration 13 described above, a process of causing the character object, which is placed in the virtual space each time the first input operation is performed by the user, to perform an action on the target object after a waiting time elapses, may be performed, and the parameter may be changed before the action is started.

According to the above configuration, if the timing when the first input operation is performed and the timing when the character object starts the action for the target object do not coincide and there is a time difference therebetween, the event can be inhibited from occurring a number of times more than the user intends without giving the user a visually uncomfortable feeling about the action of the character object.

According to the exemplary embodiments, in a situation in which an event that changes a parameter is continuously caused to occur, for example, by repeatedly pressing a button, the event can be prevented from occurring a number of times more than the user intends, so that the operability for repeated input can be improved.

BRIEF DESCRIPTION OF THE DRAWINGS

FIG. 24 shows a non-limiting example of supporter type master data 303;

FIG. 25 shows a non-limiting example of supporter data 304;

FIG. 26 shows a non-limiting example of work target data 305;

DETAILED DESCRIPTION OF NON-LIMITING EXAMPLE EMBODIMENTS

Hereinafter, one exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
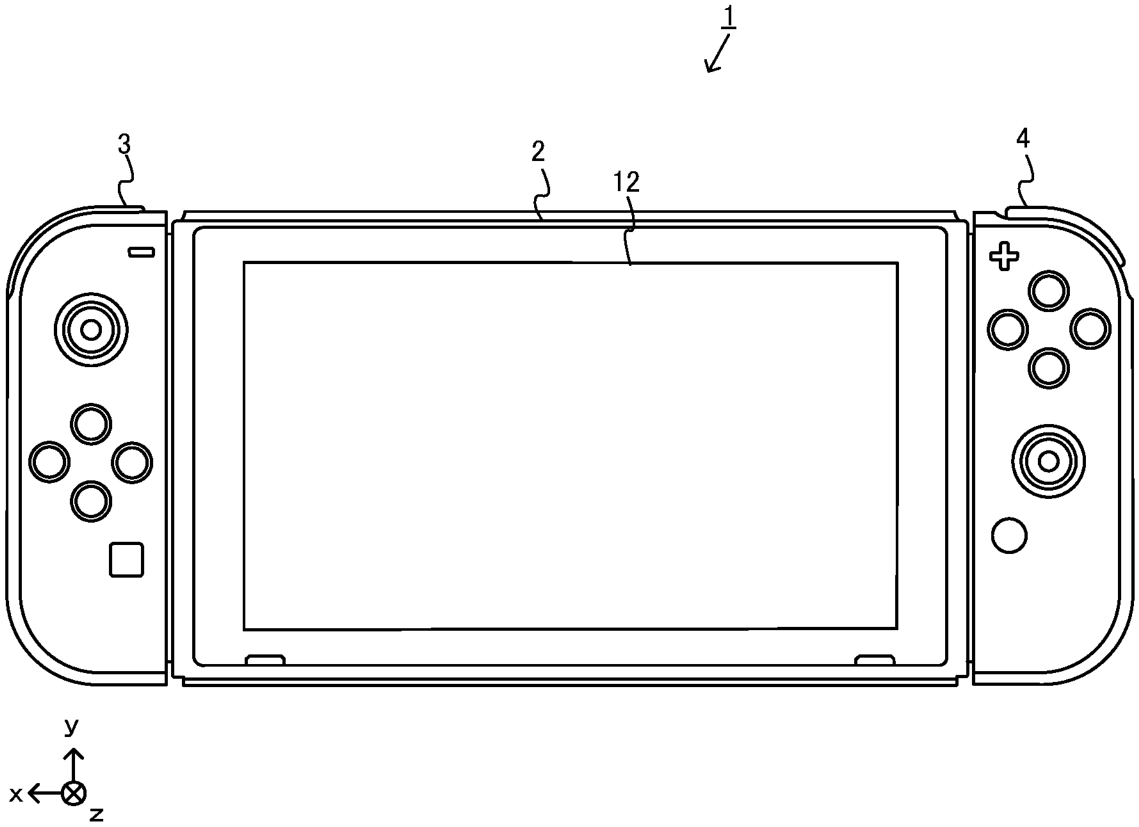
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
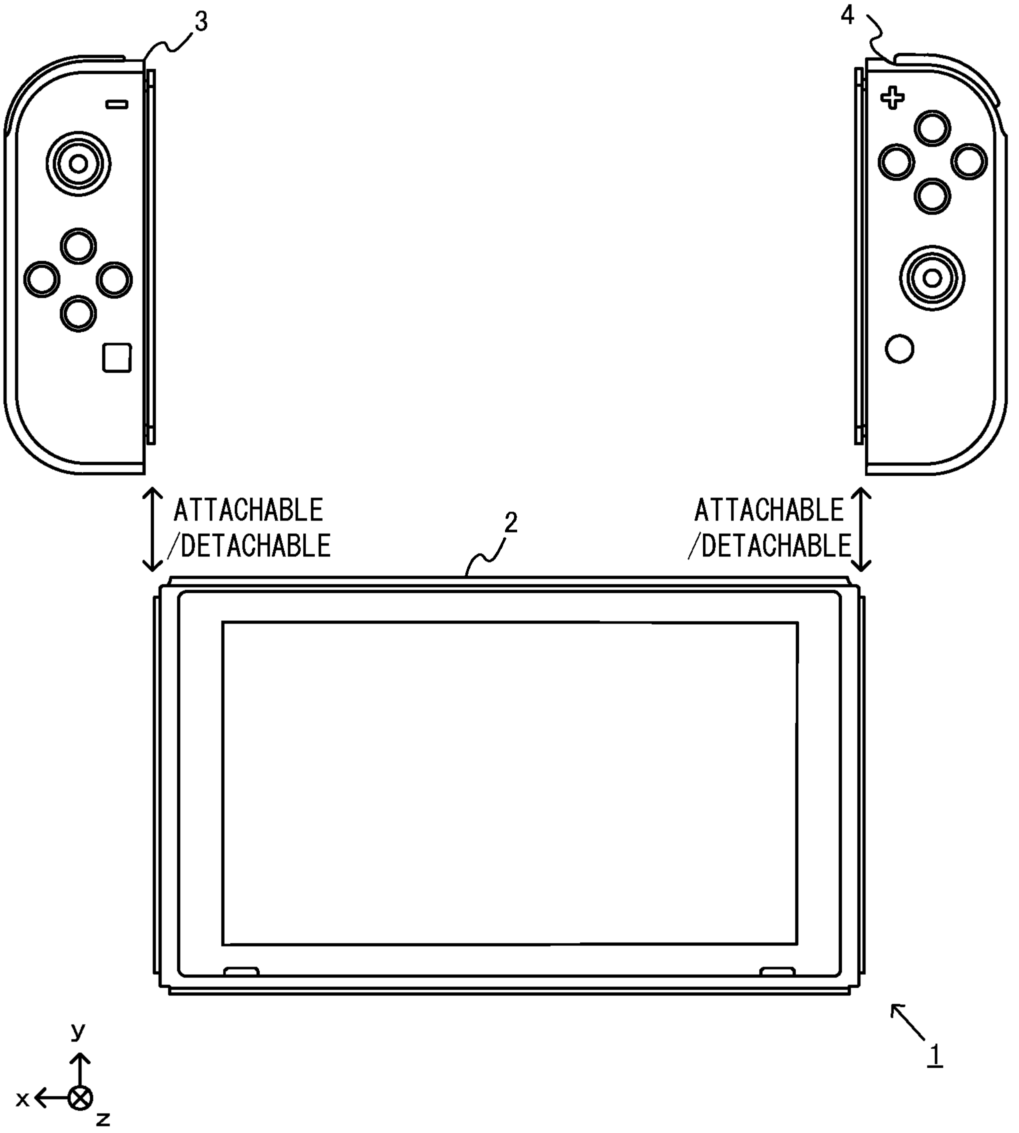
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
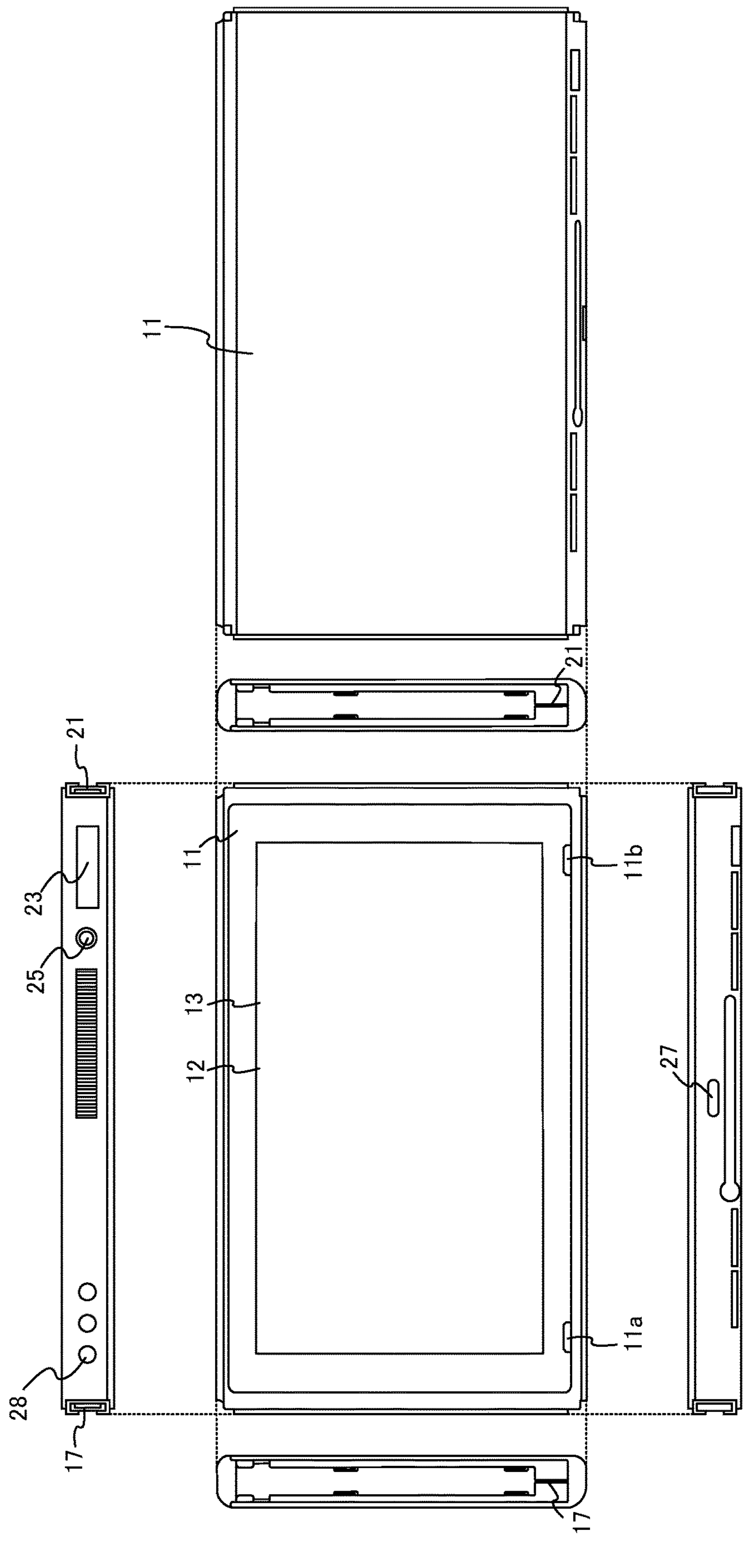
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11*a* and 11*b* are formed in the main surface of the housing 11. Then, sounds outputted from the speakers 88 are outputted through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
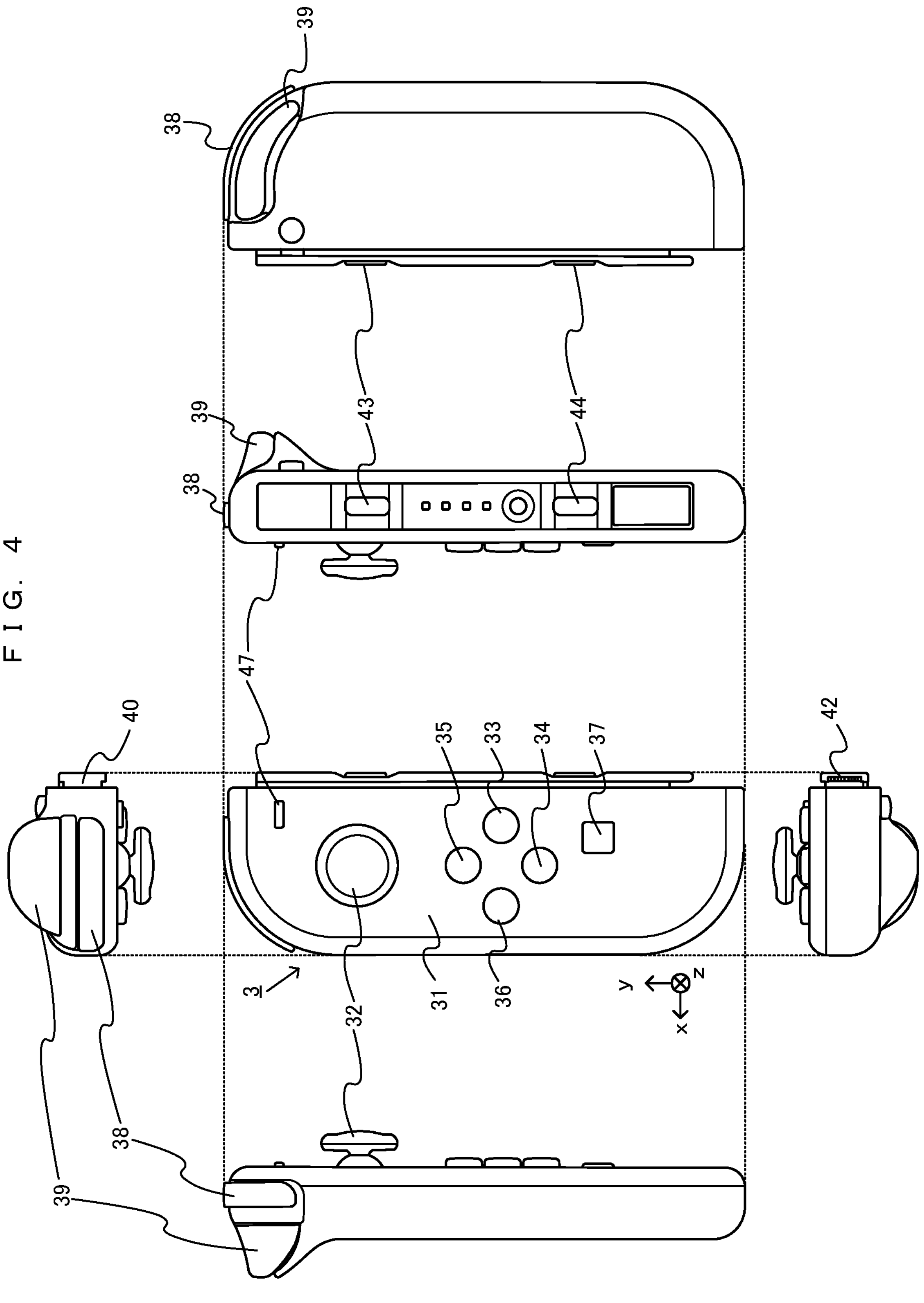
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36

(specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
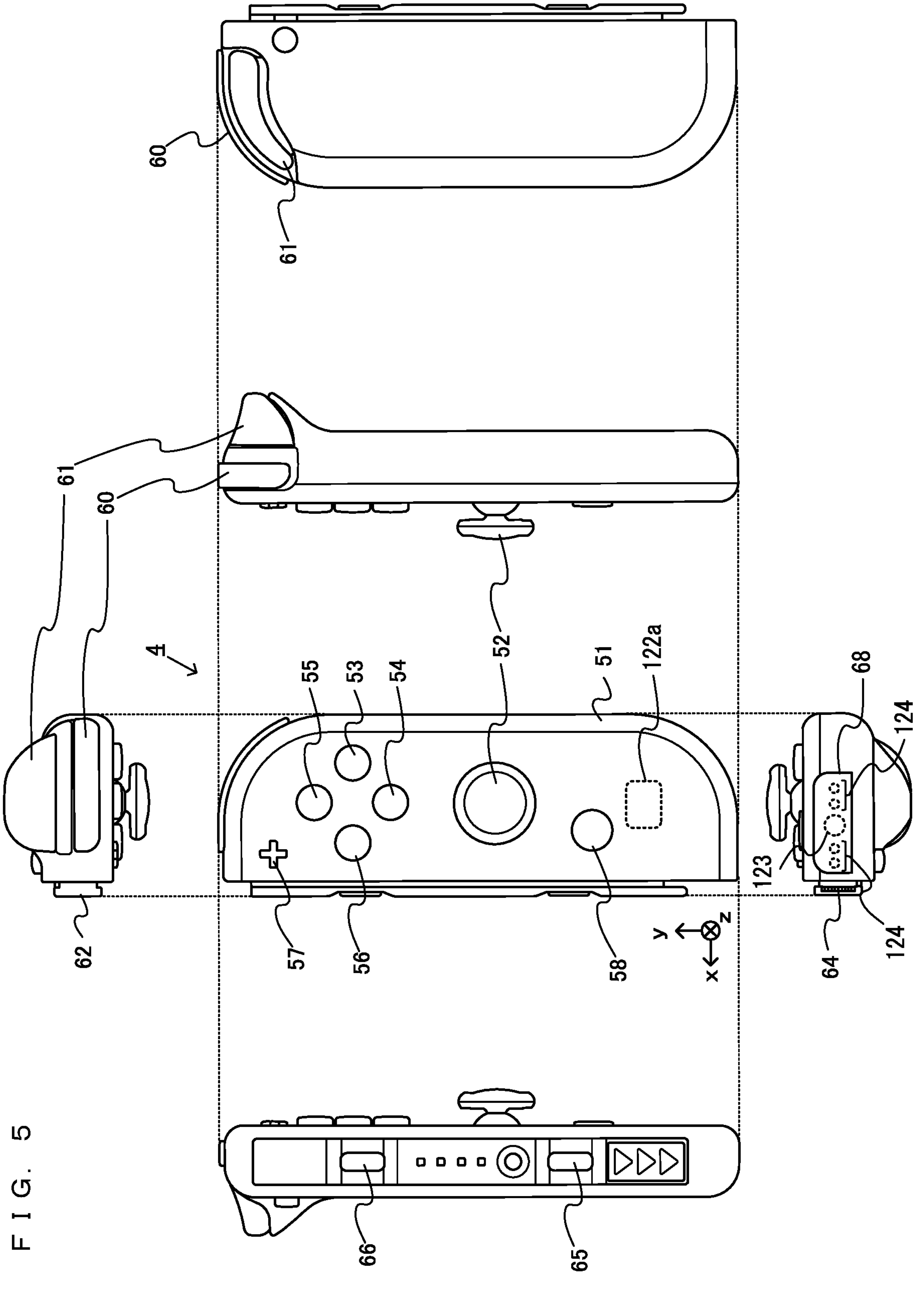
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
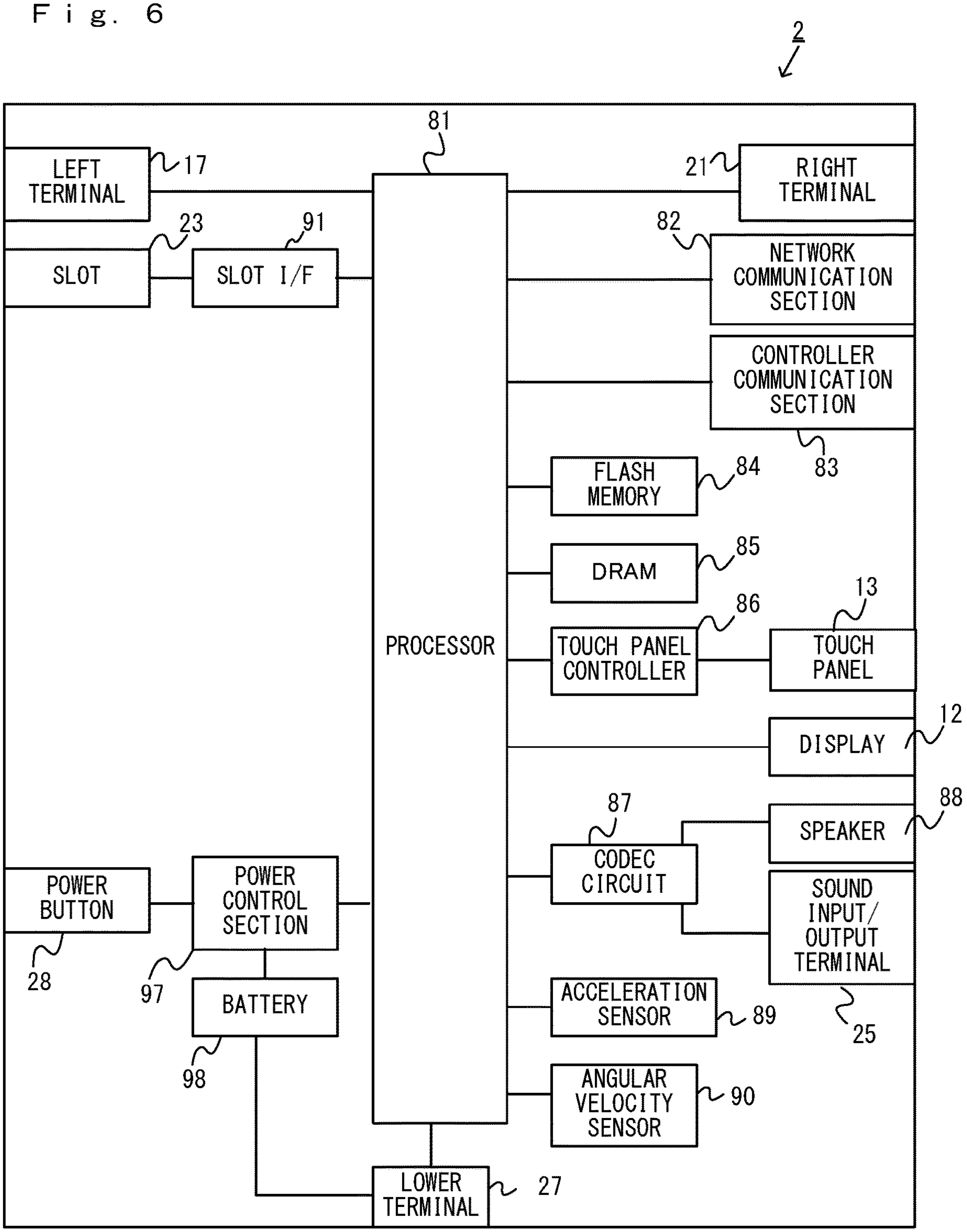
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
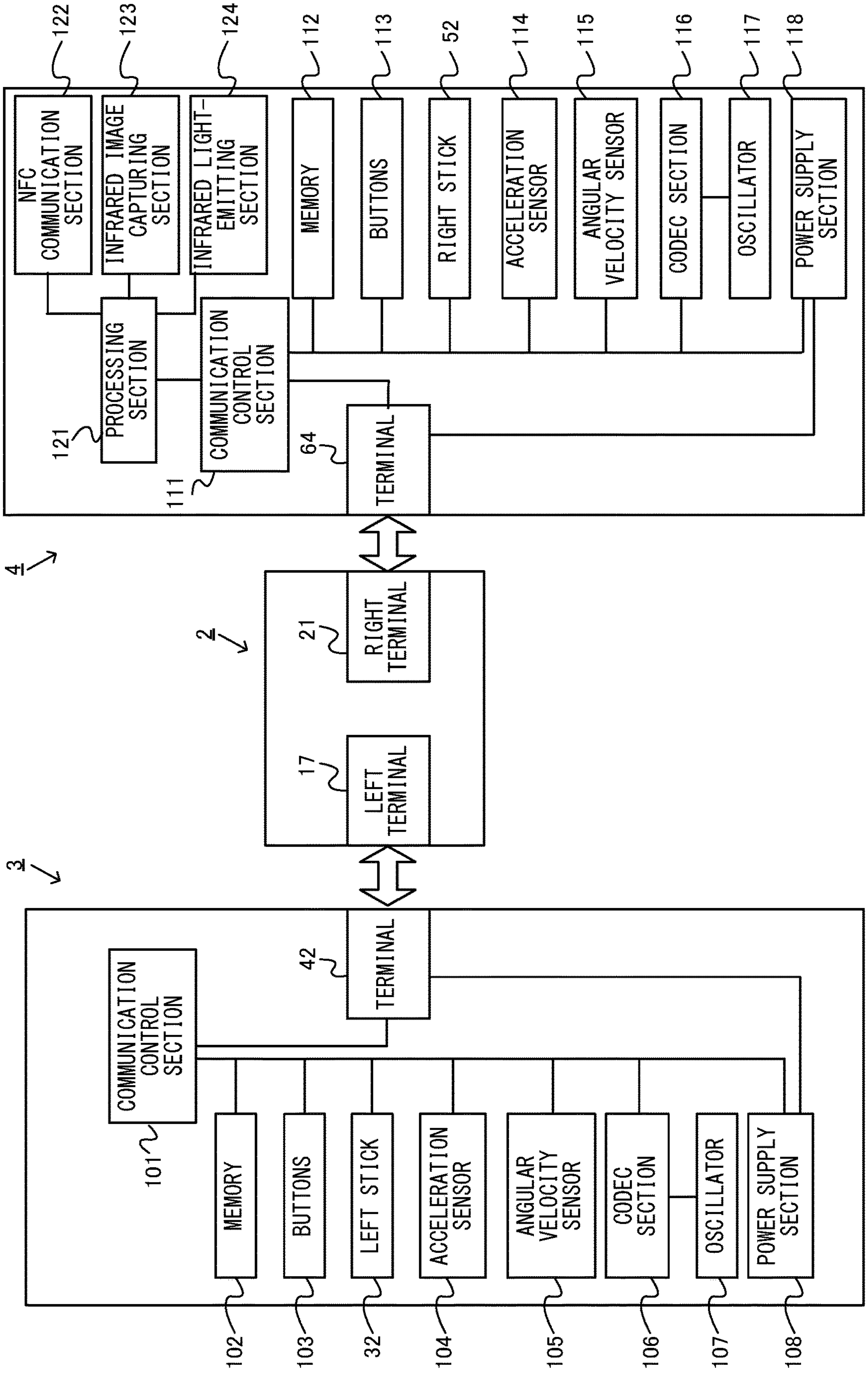
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data.

Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Hereinafter, an outline of operation of processing executed by the game system 1 according to the exemplary embodiment will be described. The processing according to the exemplary embodiment is processing for improving the convenience of the user when continuously performing a predetermined operation such as repeatedly pressing a button of a controller. Specifically, when repeated pressing is performed more than necessary in view of the situation of a game, control in which an input related to the repeated pressing is treated to be (temporarily) deactivated is performed.

Outline of Game Processing in Exemplary Embodiment

Figure 8:
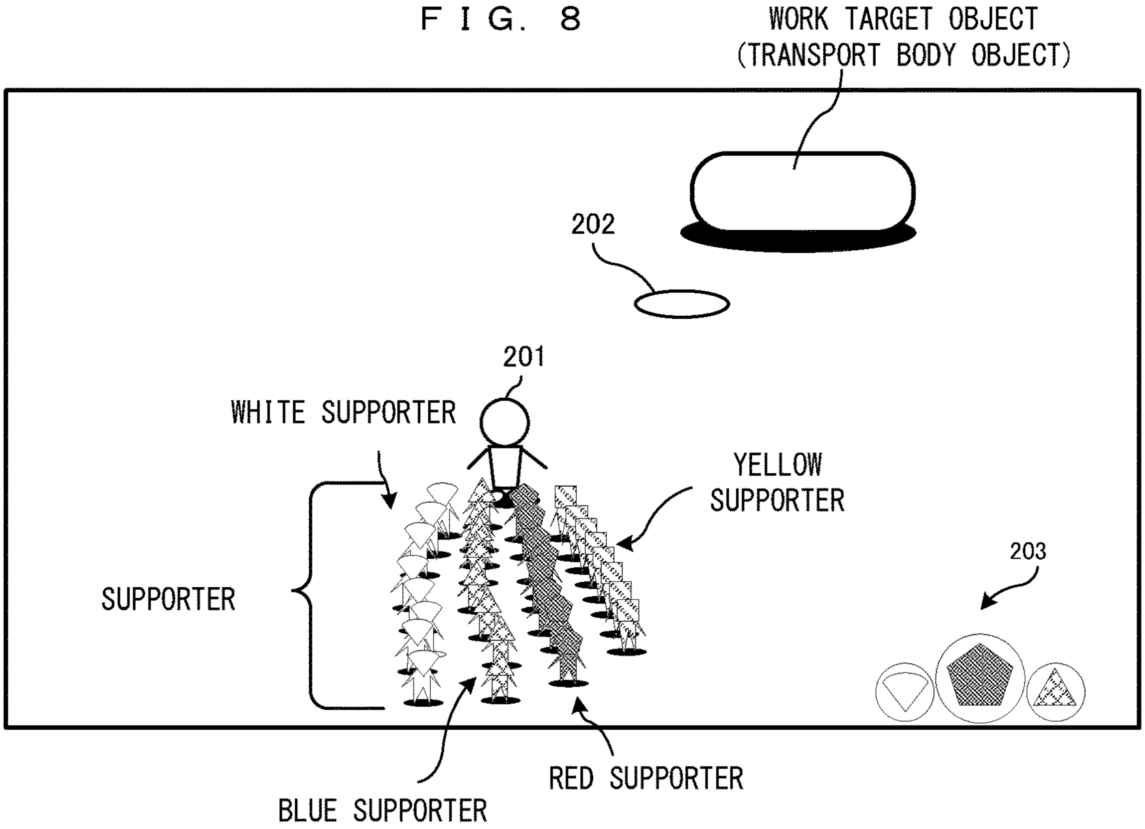
FIG. 8 shows a non-limiting example of a game screen according to an exemplary embodiment.

First, a game assumed in the exemplary embodiment will be described. FIG. 8 shows an example of a screen of the game according to the exemplary embodiment. The game is a game in which a player character object (hereinafter, referred to as PC) 201 displayed in a third person view is operated in a virtual three-dimensional space (hereinafter, referred to as virtual space). In the example in FIG. 8, the PC 201 and a cursor 202 associated with the PC 201 are displayed. In addition, in FIG. 8, a plurality of supporter character objects (hereafter, simply referred to as supporters) for supporting the PC 201 are displayed. Moreover, one work target object (hereafter, simply referred to as work target) is displayed. Moreover, a switching guide 203 is displayed at a lower right portion of the screen.

In the game, the PC 201 and the cursor 202 can be moved in conjunction by the user performing a predetermined operation. Specifically, the cursor 202 and the PC 201 can be moved by operating the left stick 32. At this time, the PC 201 basically moves while maintaining a constant distance from the cursor 202. Therefore, the user can move both the PC 201 and the cursor 202 at the same time while there is a predetermined distance therebetween.

Furthermore, the user can cause the PC 201 to "throw" the above supporter to the position of the cursor 202. Hereinafter, this operation is referred to as "throwing operation". In addition, an action (animation) of the PC 201 related to the throwing is referred to as "throwing action". Moreover, in this example, the throwing operation is pressing of the A-button 53. Pressing and releasing the A-button 53 once is one operation, and one supporter can be thrown at the position of the cursor 202. In addition, the user can also continuously throw supporters by repeatedly pressing the A-button 53. Hereafter, the supporters to be thrown are referred to as "throwing target supporters". The supporter type of throwing target supporters is referred to as "throwing target type". The state where the A-button 53 is being repeatedly pressed is referred to as "repeated pressing state", continuously throwing supporters by repeated pressing is referred to as "continuous throwing", and the state of the PC 201 during continuous throwing is referred to as "continuous throwing state".

The supporter thrown on the basis of the throwing operation performs various actions corresponding to a work target near the landing point, on the work target. That is, the game is a game that can be advanced by throwing supporters toward various work targets and causing the supporters to perform various actions on the various work targets. Examples of the actions that are performed by the supporters are as follows. There is an attack action of attacking an enemy character (not shown). There is also a transporting action of transporting a predetermined item to a predetermined position. In addition, there is a destroying action of destroying an obstacle (a rock, a gate, etc.) blocking a path.

Next, the supporters will be described. The supporters are NPCs (non-player characters) associated with the PC 201. The supporters are biological character objects that act autonomously to some extent through AI control. Here, the game has a concept of "party". The "party" can be composed of one "leader" and a plurality of "members". The "leader" is the PC 201. The supporters can be "members". The supporters are scattered on a game field in a state where the supporters do not belong to any party. The user can add a predetermined supporter to their own party by performing a predetermined operation. In the game, the PC 201 moves in a unit of the "party". Therefore, the supporter that has joined the party automatically moves so as to follow the movement of the PC 201. In addition, only the supporters in the party can be the above throwing target supporters.

Here, in the exemplary embodiment, the supporters are divided into a plurality of types, and each type has a different appearance. In the exemplary embodiment, the case where there are four types of supporters will be described as an example. In the exemplary embodiment, it is assumed that the base color of the appearance is different for each type, and specifically, the base colors of the respective types are red, blue, white, and yellow. Therefore, in the following description, the respective types of supporters are referred to as "red supporter", "blue supporter", "white supporter", and "yellow supporter". The example in FIG. 8 shows a state where the supporters in the party are arranged substantially in a vertical line for each type. In addition, in this example, there are eight supporters for each type. That is, there are a total of 32 supporters in the party.

In the exemplary embodiment, each type of supporters has not only a different appearance but also different characteristics and performance. For example, an attack power and a work power described later can be different depending on the type of supporters.

Next, the work target shown in FIG. 8 will be described. The work targets are various objects to be targeted for predetermined actions performed by the above supporters. Examples of the work targets include enemy character objects to be targeted for the attack action, a transport body object to be targeted for the above transporting action, an obstacle object to be targeted for the above destroying action, etc.

Here, as a premise for the following description, the types of work targets in the game will be described. The work targets are broadly classified into two types. One of the types is a type of work targets for which a "required work power" is set, and the other type is a type of work targets for which no "required work power" is set. In the following description, the former is referred to as "required power set type" work targets, and the latter is referred to as "required power non-set type" work targets. In addition, in the following, a description will be given with the case where one example of the "required power set type" work targets is the above transport body object and one example of the "required power non-set type" work targets is the above obstacle object, as an example.

First, a parameter of "required work power" is set in advance for each "required power set type" work target. In addition, a parameter of "work power" is set for each of the above supporters. When the total of the work powers of supporters thrown to a "required power set type" work target becomes equal to or larger than the required work power, an action corresponding to the "required power set type" work target is started. Meanwhile, such a "required work power" is not set for each "required power non-set type" work target, and even when only one supporter is thrown to a "required power non-set type" work target, an action corresponding to the work target can be started. In this example, as for the transport body object which is one example of the "required power set type" work targets, transport of the transport body object cannot be started unless the total of the work powers of supporters becomes equal to or larger than the "required work power". In addition, as for the obstacle object which is an example of the "required power non-set type" work targets, if even one supporter is thrown thereto, a destroying action by only this one supporter is started. When a plurality of supporters perform the destroying action, the obstacle object can be destroyed more quickly, but it is possible to destroy the obstacle object with only one supporter, although it takes longer.

Furthermore, in the game, the work targets are classified by another classification method different from the above classification method. Hereinafter, the former classification method is referred to as "first classification", and the latter classification method is referred to as "second classification". In the second classification, specifically, the work targets are classified into two types: work targets for which the type of supporters that can perform a predetermined action is limited; and work targets for which there is no such limitation and a predetermined action can be performed by any type of supporters. Hereinafter, the former is referred to as "type-limited type", and the latter is referred to as "type-unlimited type". One example of the "type-limited type" work targets is an obstacle object that is an "electric gate". The "electric gate" is, for example, an obstacle object that is set so as to emit a high-voltage electric current. Only the yellow supporters can perform the destroying action on this obstacle object, and the other supporters are damaged by this obstacle object.

As described above, in the game, the work targets are classified into the "required power set type" and "required power non-set type" work targets by the first classification, and classified into the "type-limited type" and "type-unlimited type" work targets by the second classification. In the following, a description will be given on the assumption that all the "required power set type" work targets are "type-unlimited type" work targets and only the "required power non-set type" work targets are classified into "type-limited type" and "type-unlimited type".

On the assumption that the work targets are classified as described above, in the exemplary embodiment, in particular, a situation in which the user performs a throwing operation for the transport body object and the obstacle object will be described as an example. Specifically, two cases, that is, the case of causing the PC 201 to perform a throwing action for the transport body object and the case of causing the PC 201 to perform a throwing action for the obstacle object, will be described as an example.

First, the case of causing the PC 201 to perform a throwing action for the transport body object will be described. As described above, the parameter of "required work power" is set in advance for the transport body object, and when the total of the work powers of supporters thrown to the transport body object becomes equal to or larger than the required work power, transport (movement) of the transport body object can be started. In the exemplary embodiment, as one example of the work power of each type of supporters, it is assumed that the red supporters, the blue supporters, and the yellow supporters have a work power of "1", and the white supporters have a work power of "10". Based on this assumption, the case of causing the supporters to transport a transport body object for which "20" is set as a required work power is illustrated using screen examples.

FIG. 8 shows a screen example of a state before an operation for transport is started. In this state, first, the user performs an operation for "locking on" the transport body object. Locking on is to fix the position of the cursor 202 at the position at which a predetermined work target is located. Specifically, the user moves the cursor 202 closer to the transport body object and presses a lock-on button (in this example, the ZR-button 61). Then, the operation mode of the cursor 202 is switched to a lock-on mode, and the cursor 202 moves to a position where the cursor 202 is superimposed on the work target that is near the cursor 202 at this time, in this case, the transport body object. Accordingly, the display position of the cursor 202 is fixed at the position of the transport body object, causing a state where the transport body object is locked on. In the following description, the locked-on work target is referred to as "target".

During the lock-on mode, the cursor 202 is fixed to the target. Thus, during the lock-on mode, the user can throw a supporter at the target without manually performing an operation for moving the cursor 202. As for cancellation of the lock-on mode, in this example, the lock-on mode can be cancelled by pressing the B-button 54. Also, when the target becomes separated from the PC 201 by a predetermined distance or larger, the lock-on mode is automatically cancelled. When the lock-on mode is cancelled, the cursor 202 moves to a basic position which is the position at a predetermined distance from the front of the PC 201. After that, the cursor 202 moves in accordance with an operation by the user.

Figure 9:
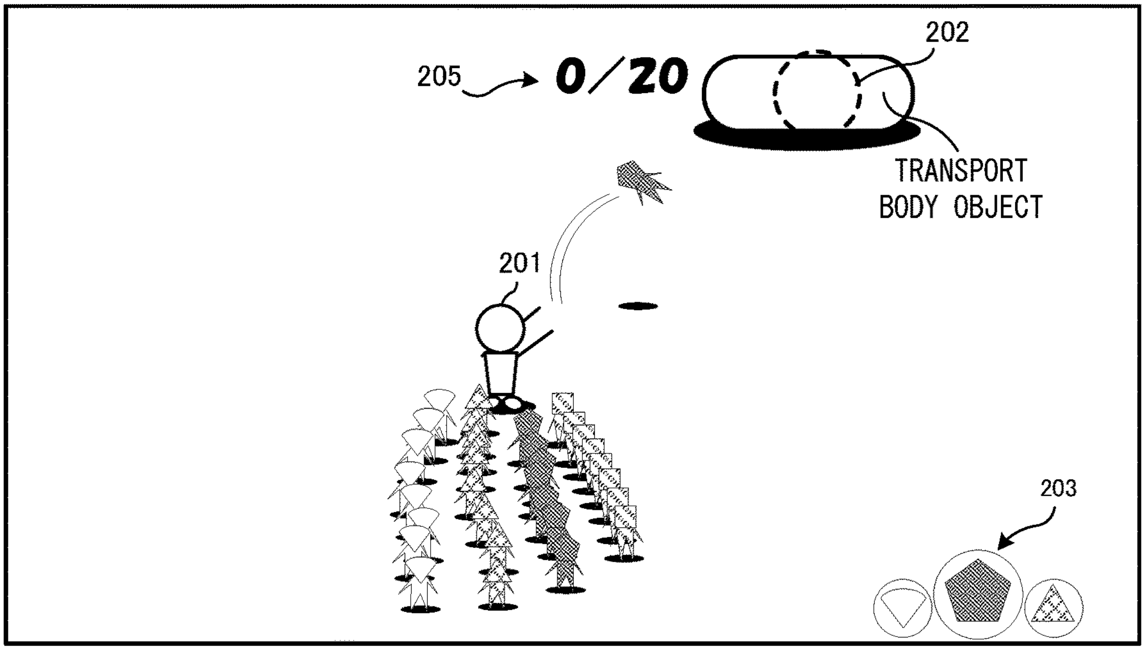
FIG. 9 shows a non-limiting example of the game screen according to the exemplary embodiment.

After locking on the transport body object as described above, when the user presses the A-button 53, the PC 201 starts the throwing action as shown in FIG. 9. Here, supplementary description will be given regarding determination of a throwing target supporter. In FIG. 8 and FIG. 9, the switching guide 203 is displayed at the lower right portion of the screen. The switching guide 203 is an image in which three circular frames are aligned laterally and the center circular frame is larger than the right and left circular frames. A face image of each type of supporters is displayed in each circular frame. In the example in FIG. 8 and FIG. 9, the face images of the white supporters, the red supporters, and the blue supporters are displayed in this order from the left. In this example, the center circular frame indicates the current throwing target type. Therefore, when the user performs a throwing operation in this state, a throwing action of throwing a red supporter toward the cursor position is performed. In addition, by performing a predetermined "switching operation", the user can select the current throwing target type. For example, by pressing the first R-button 60 in the state in FIG. 8, the user can switch so as to slide the three face images in the switching guide 203 rightward. As a result, the face image of the white supporters is displayed in the center circular frame, and the white supporters can be selected as the current throwing target type. Also, by pressing the first L-button 38, the user can switch so as to slide the three face images leftward. As a result, the face image of the blue supporters is displayed in the center circular frame, and the blue supporters can be selected as the current throwing target type.

Figure 11:
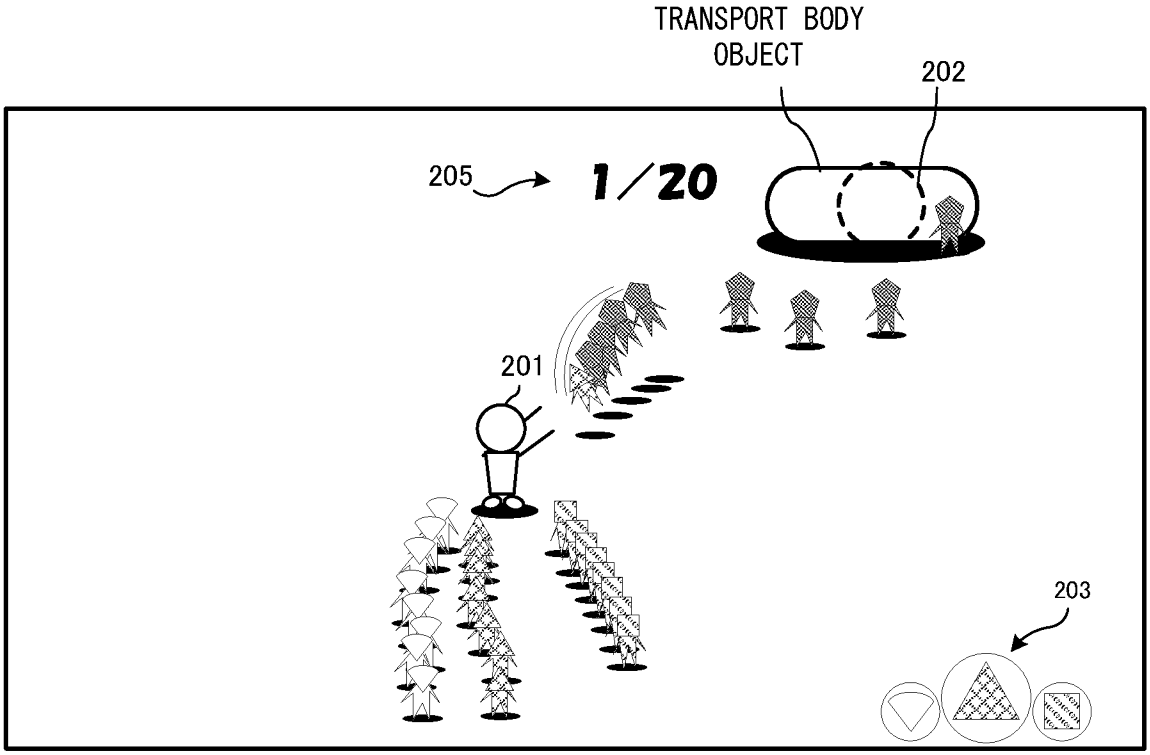
FIG. 11 shows a non-limiting example of the game screen according to the exemplary embodiment.

Here, as described above, by repeatedly pressing the A-button 53, the user can cause the PC 201 to continuously throw supporters. While the PC 201 is continuously throwing supporters as described above, if the remaining number of the current throwing target type of supporters in the party reaches 0, the current throwing target type is automatically switched in a predefined order. That is, if the user continues to repeatedly press the A-button 53, for example, when the throwing of the eight red supporters ends, the throwing target type is automatically switched to the blue supporters, and the PC 201 continuously throws the blue supporters (FIG. 11 described later). As described above, in the exemplary embodiment, there are two methods for selecting the current throwing target type. In the following description, the method based on the above switching operation is referred to as "manual switching", and the method of automatic switching when the remaining number of supporters of a certain type in the party reaches 0 as described above is referred to as "automatic switching".

Figure 10:
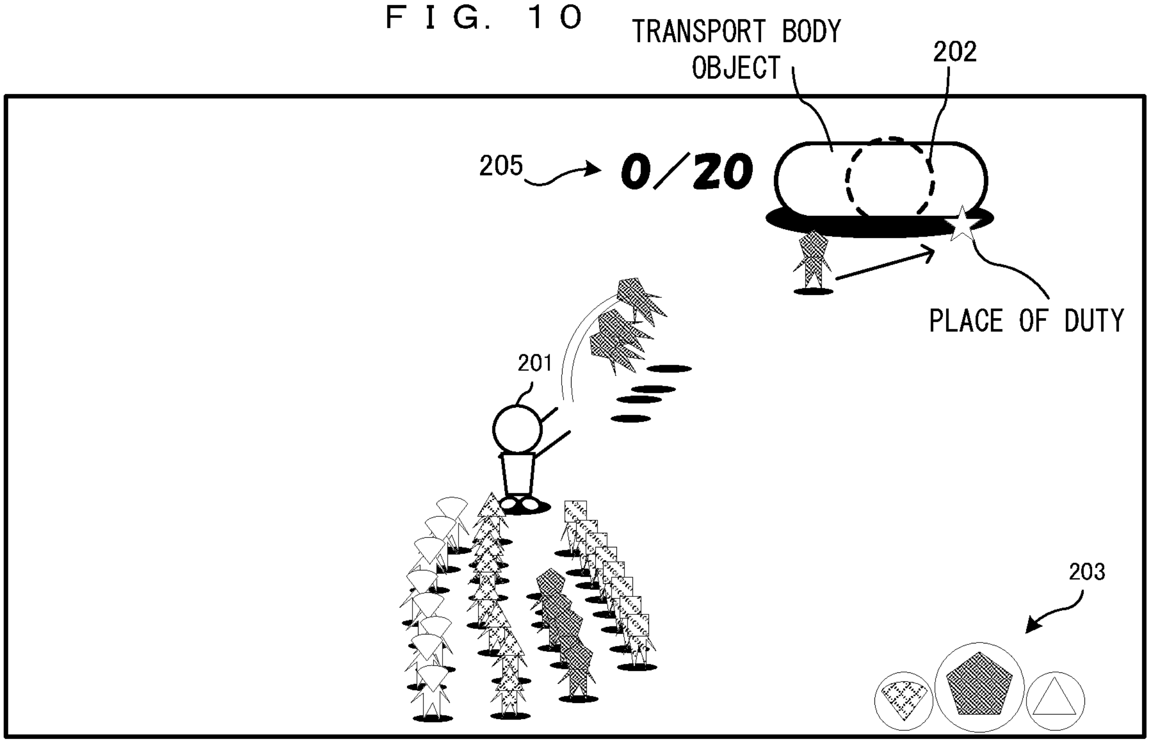
FIG. 10 shows a non-limiting example of the game screen according to the exemplary embodiment.

If the user further continues to repeatedly press the A-button 53 from the state in FIG. 9, the red supporters are continuously thrown as shown in FIG. 10. In addition, the first thrown red supporter has landed on the ground (more precisely, this red supporter has landed after hitting the target at the cursor position and bouncing back). The supporter that has landed starts moving toward a placement position for executing the transporting action (hereinafter, referred to as place of duty, and indicated by a star in FIG. 10). The time required for the supporter to reach the place of duty and start the transporting action after being thrown is, for example, about 1 second. In other words, the supporter starts the transporting action 1 second after the throwing operation is performed.

If the user continues to repeatedly press the A-button 53 from the state in FIG. 10, a state shown in FIG. 11 arises. In FIG. 11, since the remaining number of red supporters in the party reaches 0, the current throwing target type is switched to the blue supporters as a result of the above automatic switching being performed, and the first blue supporter is thrown. In addition, the movement of the first thrown red supporter to the place of duty has been completed, and while the required work power is not satisfied, an animation showing the red supporter trying to lift the transport body object but not lifting the transport body object is reproduced. Moreover, the second to fourth red supporters that have landed after that are moving toward the place of duty. Moreover, the fifth to eighth red supporters are still in the middle of movement related to the throwing (hereinafter, referred to as throwing movement).

Here, in FIG. 9 to FIG. 11, a work power status image 205 is displayed on the left side of the transport body object. The work power status image 205 will be described below. This image is an image in which the required work power set for the transport body object which is the target is shown as a denominator and the currently accumulated work power (hereinafter, referred to as "operating power") is shown as a numerator. In the case of FIG. 9 and FIG. 10, since no supporter has reached the target (place of duty) yet, the operating power remains 0 with respect to the required work power. Meanwhile, in the state in FIG. 11, only one red supporter has reached the place of duty. In the exemplary embodiment, the indication of the operating power is counted up when a supporter reaches the place of duty. Therefore, in FIG. 11, the operating power has changed to 1.

Figure 12:
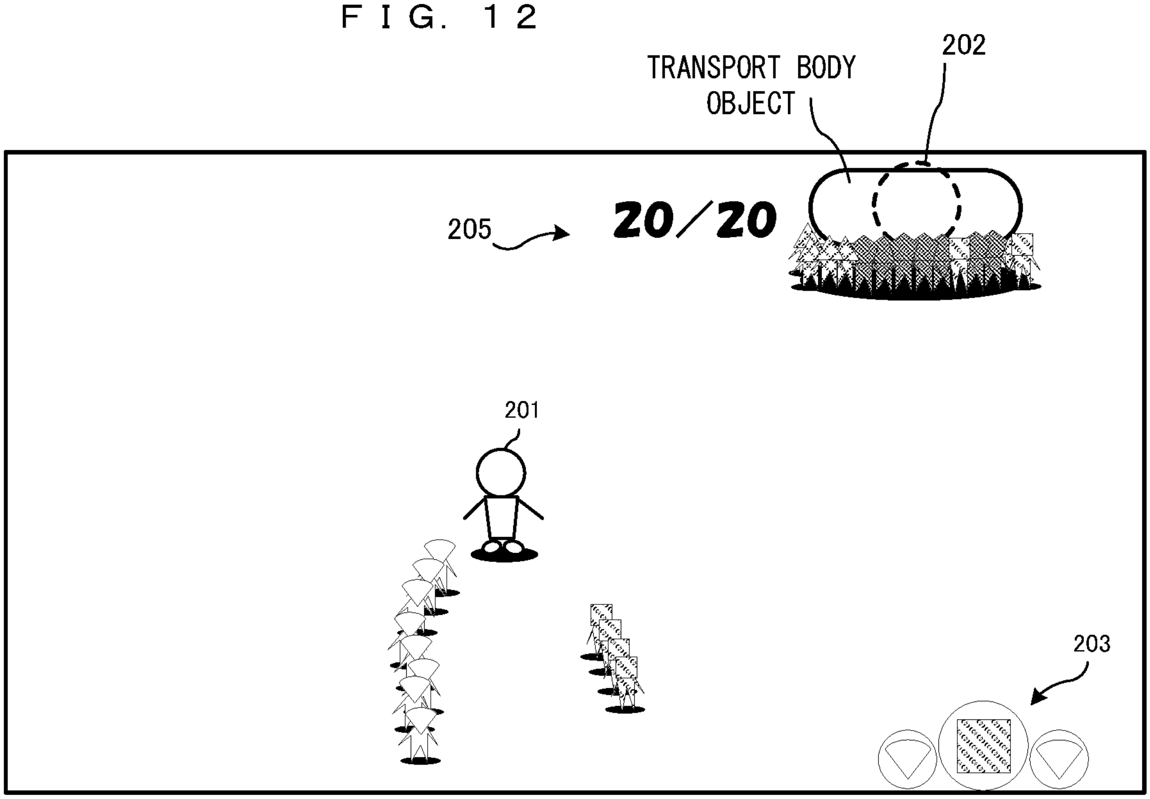
FIG. 12 shows a non-limiting example of the game screen according to the exemplary embodiment.
Figure 13:
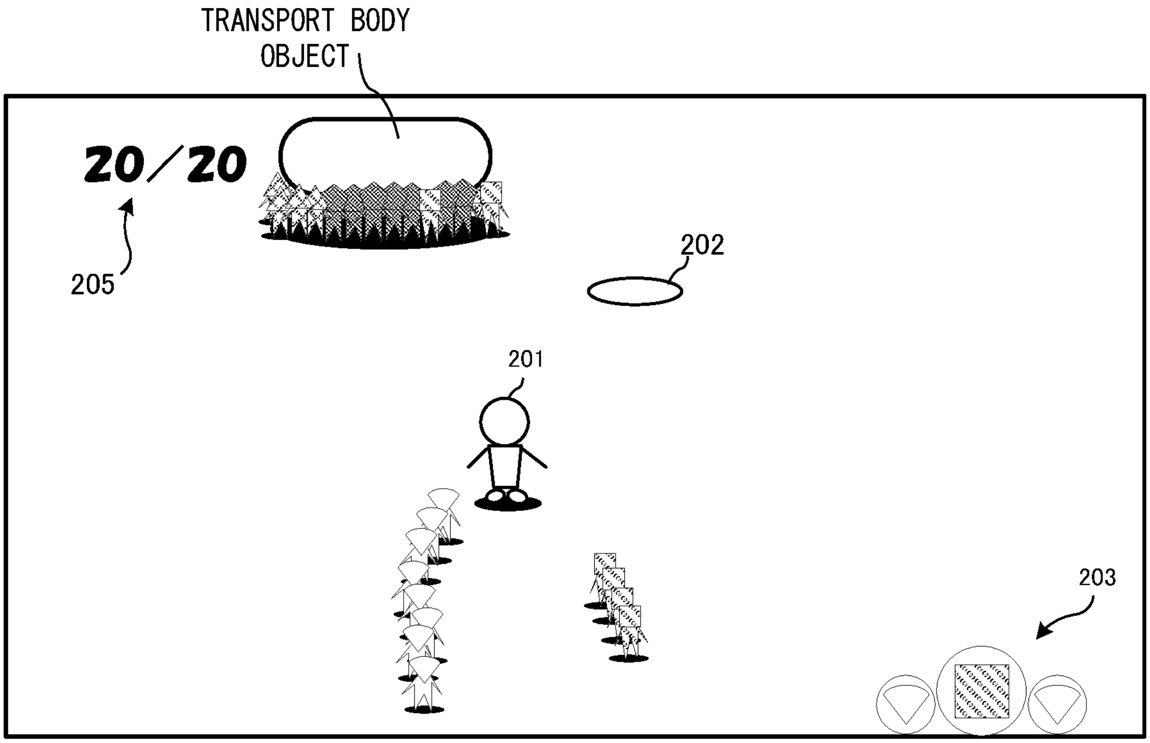
FIG. 13 shows a non-limiting example of the game screen according to the exemplary embodiment.

After the user continues to repeatedly press the A-button 53 from the state in FIG. 11 and throwing of a total of 20 supporters (eight red supporters, eight blue supporters, and four yellow supporters) ends, when all the 20 supporters reach the place of duty, transport of the transport body object is started. As a result, a screen shown in FIG. 12 can be displayed. In FIG. 12, the required work power and the operating power are both 20 in the work power status image 205, which indicates that the required work power for transport is satisfied. Then, as shown in FIG. 13, the transport body object is transported toward a predetermined destination (not shown). FIG. 13 also shows that the lock-on is also automatically cancelled since the distance between the PC 201 and the transport body object becomes equal to or larger than a predetermined distance as the transport body object moves.

As described above, in the exemplary embodiment, by throwing supporters such that work powers equal to or larger than the required work power set for the transport body object are accumulated, it is possible to cause the supporters to transport the transport body object.

When supporters whose work powers are equal to or larger than the required work power are thrown, the transport speed may be increased. For example, for the above transport body object having a required work power of 20, the transport speed may be made higher in a state of an operating power of 30 than in the state of an operating power 20 as described above. Accordingly, by throwing supporters such that the work powers thereof are equal to or larger than the required work power, the transport body object can be transported to the destination more quickly.

Meanwhile, regarding the operation of repeatedly pressing the A-button 53 by the user as described above, the following problems can be considered. First, when the user simply repeatedly presses the A-button 53, supporters whose number is more than necessary may be thrown. In the above example, the following situation is considered: when the user simply repeatedly presses the A-button 53, even if throwing of 20 supporters ends, the user does not stop the repeated pressing at the right timing and still continues to repeatedly press the A-button 53. In particular, in the exemplary embodiment, the count-up of the work power status image 205 is performed when a supporter reaches the place of duty. Therefore, when the throwing operation for 20 supporters is completed (20 times of repeated pressing), some supporters are still in the middle of throwing movement and have not reached the place of duty yet, and thus the indication of the work power status image 205 has not become "20/20". For example, when the user finishes the throwing operation for 20 supporters, the work power status image 205 may indicate "18/20". Therefore, it is considered that the user may determine that the throwing operation required for starting transport has not been completed, and may continue to repeatedly press the A-button 53. However, if the user continues to repeatedly press the A-button 53, throwing of the 21st supporter may be wasteful throwing. In order to suppress such wasteful throwing, it is considered that if the user intends to throw, for example, only 20 supporters, the user may perform the throwing operation while counting the number of times the throwing operation is performed (the number of times the A-button 53 is pressed) in their mind. However, if the user merely counts the number of times of the throwing operation in their mind, there is still a possibility that the user cannot stop the operation as intended and a few supporters more than necessary are thrown due to the momentum of the repeated pressing operation. Therefore, as another operation, an operation of stopping the repeated pressing operation once in the middle and then slowly performing the throwing operation for the rest for adjustment, is also conceivable. For example, when the indication of the work power status image 205 reaches "15/20", the user stops the repeated pressing operation once, and then presses the A-button 53 each time confirming throwing of one supporter. In this case, the possibility of suppressing wasteful throwing is increased, but, since the repeated pressing operation is stopped in the middle, the tempo of subsequent operations may be deteriorated, and the user cannot start the transporting action promptly, which may lead to a decrease in operability.

Therefore, in the exemplary embodiment, control in which, when a throwing operation that satisfies the required work power is performed, control for the throwing action of the PC 201 is temporarily stopped, is performed. Specifically, for 1 second after the throwing operation that satisfies the required work power is performed, the PC 201 is controlled not to perform the throwing action even if the A-button 53 is pressed. Hereinafter, controlling not to perform the throwing action as described above is referred to as "stopper". Accordingly, occurrence of wasteful throwing as described above is suppressed while maintaining good tempo of operation by repeated pressing.

Figure 14:
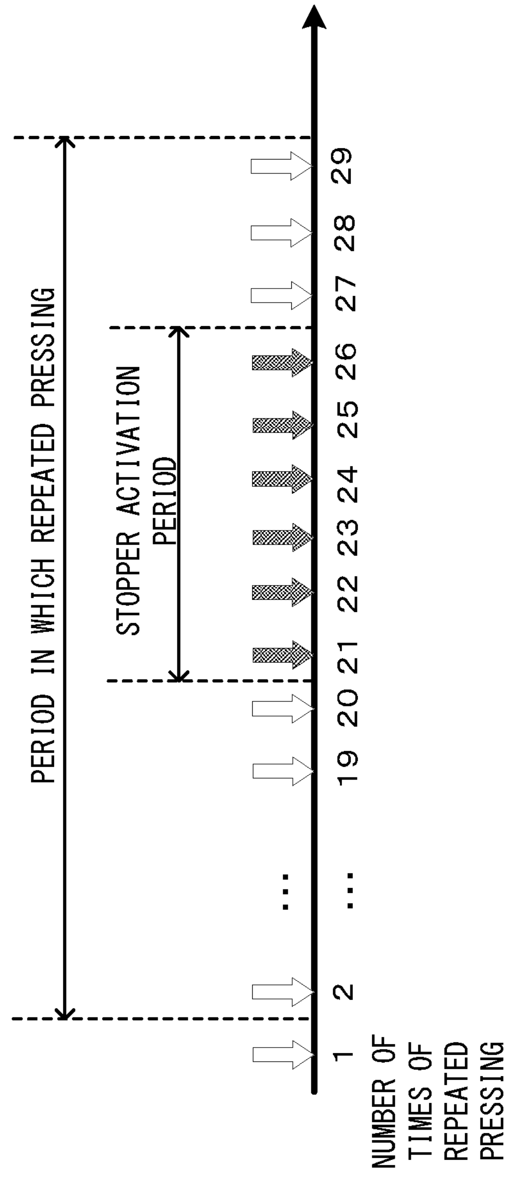
FIG. 14 illustrates a non-limiting example of an outline of stopper control according to the exemplary embodiment.

FIG. 14 illustrates an outline of stopper control according to the exemplary embodiment. In FIG. 14, it is assumed that the user presses the A-button 53 29 times from the state in FIG. 8. In this case, the above throwing action is performed until the 20th repeated pressing, and 20 supporters are thrown. Then, the stopper is activated, and during a stopper activation period which is 1 second in this example, the throwing operation is not performed even if the A-button 53 is repeatedly pressed. FIG. 12 shows that the stopper is activated and that the PC 201 is not performing the throwing action (although the repeated pressing continues). Accordingly, the user is given an uncomfortable feeling that the PC 201 does not perform the throwing action even though the repeated pressing is performed, and this uncomfortable feeling can make the user notice that throwing of the required supporters has been completed. Therefore, the user can suppress wasteful throwing by stopping the repeated pressing of the A-button 53 at this time. On the other hand, the user can also intentionally continue the repeated pressing. In this case, as shown in FIG. 14, the repeated pressing during the stopper activation period (the 21st to 26th repeated pressing) is made substantially invalid. Thereafter, the stopper activation period ends, and the throwing action is restarted from the 27th repeated pressing. Therefore, the 21st supporter is thrown in accordance with the operation of the 27th repeated pressing in FIG. 14. That is, when the user repeatedly presses the A-button 53 as shown in FIG. 14, the action of the PC 201 is as follows: throwing of 20 supporters, stop of the throwing action for 1 second, and restart of the throwing action after 1 second elapses.

Here, in the example in FIG. 14, the case where all the supporters to be thrown to the transport body object having a required work power of 20 are supporters having a work power of "1" is assumed and described. Therefore, the stopper is activated from the 21st repeated pressing. In this regard, for example, if a white supporter having a work power of "10" is thrown at the 16th repeated pressing, the required work power is satisfied by the white supporter. Therefore, in this case, the stopper is activated (for 1 second) from the 17th repeated pressing.

In the exemplary embodiment, the stopper is activated when a throwing operation that satisfies the required work power is performed. Therefore, even if the work power status image 205 indicates that the required work power has not been satisfied yet, the stopper can be activated. In the above example, when the work power status image 205 is displayed to indicate "18/20", if an input of the 20 the repeated pressing of the A-button 53 is performed, the stopper is activated at this time.

Also, in the exemplary embodiment, after the stopper is activated, when the user stops the repeated pressing before 1 second elapses, the stopper is cancelled at that time. For example, after the stopper is activated, if the user stops the repeated pressing when 0.5 seconds elapses, the stopper is cancelled at that time even before 1 second elapses. Accordingly, for example, a user who is accustomed to playing the game can intentionally cancel the stopper early by immediately stopping the repeated pressing, and can restart a further throwing operation promptly.

Meanwhile, in the exemplary embodiment, while the above transport body object is locked on, when the required work power is reached and there is another transport body object nearby, control in which the lock-on target (target) is automatically switched to the other transport body object is performed (in the above screen example, since there is no other transport body object nearby, automatic target switching does not occur).

Figure 15:
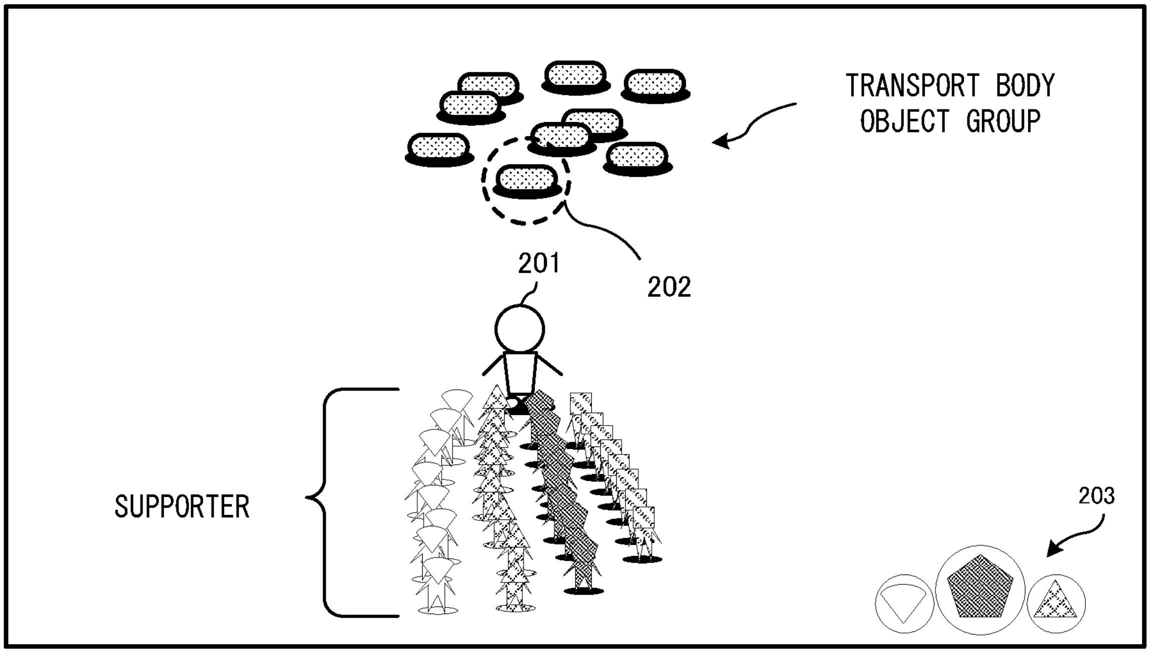
FIG. 15 shows a non-limiting example of the game screen according to the exemplary embodiment.
Figure 16:
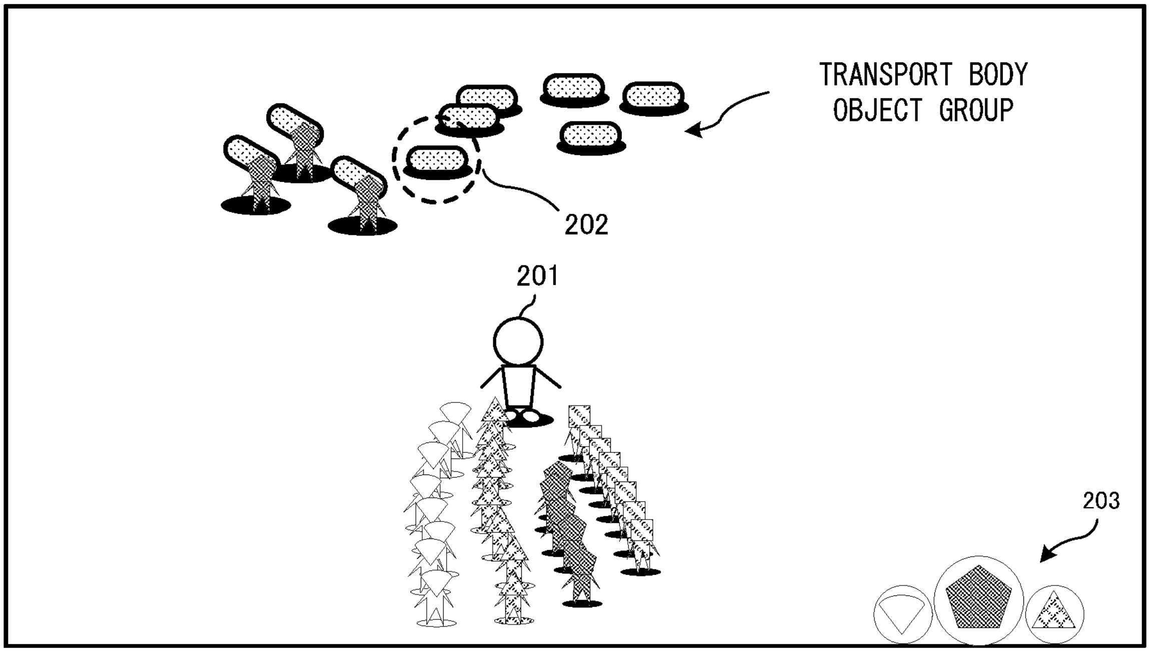
FIG. 16 shows a non-limiting example of the game screen according to the exemplary embodiment.

Here, a situation in which transport body objects are densely located in a predetermined range as shown in FIG. 15 is assumed. Also, these transport body objects have a required work power of "1". That is, this situation is a situation in which transport body objects each of which can be transported by one supporter are densely located. In such a case, when the above stopper control is performed, combined with the above automatic switching of the lock-on target, operability may be decreased. Specifically, by performing the throwing operation once, the operating power reaches the required work power. In this case, in the above control, the activation of the stopper and the automatic switching of the lock-on target can occur at the same time. Therefore, if the user repeatedly presses the A-button 53 in such a situation, even though the target has been switched, throwing to the target after the switching is not performed, due to the activation of the stopper. As a result, this may make the user feel a decrease in operability (poor response) related to repeated pressing. Therefore, in the exemplary embodiment, control in which, as an exception, the above stopper is not activated for some transport body objects having a required work power of "1" is also performed. Specifically, by adding an attribute of "stopper invalidity" to transport body objects, control in which the stopper is not activated for the transport body objects is performed. Accordingly, for the transport body objects that are in a situation in which it is considered to be better not to activate the stopper, in the above example, for the transport body objects that have a required work power of "1" and that are densely placed, the stopper is not activated, and only the above automatic switching of the lock-on target can be caused to function. As a result, the user can be provided with the operability that these transport body objects are transported one after another as shown in FIG. 16 only by repeatedly pressing the A-button 53. Furthermore, for some transport body objects having the above attribute of "stopper invalidity", the work power status image 205 is also not displayed. For the transport body objects that are not in the above situation in which it is considered to be better not to activate the stopper, such as transport body objects that have a required work power of "1" but are not densely placed as described above, the stopper may be activated and the work power status image 205 may be displayed.

[Case of Obstacle Object]

Next, the processing of the exemplary embodiment in the case of causing the PC 201 to perform the throwing action for the obstacle object will be described. As described above, in the game, the "required power non-set type" obstacle objects are further classified into two types of obstacle objects by the above second classification. Of these types, especially when the throwing operation is performed on the "type-limited type" obstacle objects, the following problems exist. For example, the obstacle object that is the above-described "electric gate" is assumed. The "electric gate" is, for example, an obstacle object that is set so as to emit a high-voltage electric current. Only the yellow supporters can perform the destroying action on this obstacle object, and the other supporters are damaged by this obstacle object. In such a case, if a type of a supporter other than the yellow supporters is thrown to this obstacle object, the HP of the supporter may reach 0 due to damage and the supporter may disappear. In particular, as described above, when the remaining number of the current throwing target type of supporters in the party reaches 0, automatic switching of the throwing target type is performed, but if the user continues to repeatedly press the A-button 53, for example, the user may throw another type of supporters without noticing that the remaining number of yellow supporters has reached 0. As a result, for example, unintended disappearance of a supporter may occur, which may result in a situation disadvantageous to the user.

Therefore, in the exemplary embodiment, while continuous throwing is being performed on the "type-limited type" obstacle object, when automatic switching of the throwing target type occurs, the above-described stopper is activated to temporarily stop the throwing action. Accordingly, by giving the user an uncomfortable feeling that throwing is not performed even though the repeated pressing is performed in the same manner as described above, "awareness" can be given to the user. Accordingly, a trigger to stop repeatedly pressing the A-button 53 can be given to the user.

When the throwing target type is switched by the above manual switching, the above stopper is not activated. This is because, since the manual switching is an intentional switching operation by the user, if the stopper is activated in this case, even though the switching is performed by the intention of the user and a throwing operation is performed, throwing is not performed, which may lead to a decrease in operability.

In the exemplary embodiment, the stopper is activated only once within one period of repeated pressing (a period from the start to the end of a series of repeated pressing operations, and hereinafter, referred to as one repeated pressing period). If the stopper is activated once but repeated pressing continues, it is inferred that the user intentionally performs the repeated pressing. Therefore, in this case, the intention of the user is respected, and the stopper is not activated for the second time and later during the one repeated pressing period.

Figure 17:
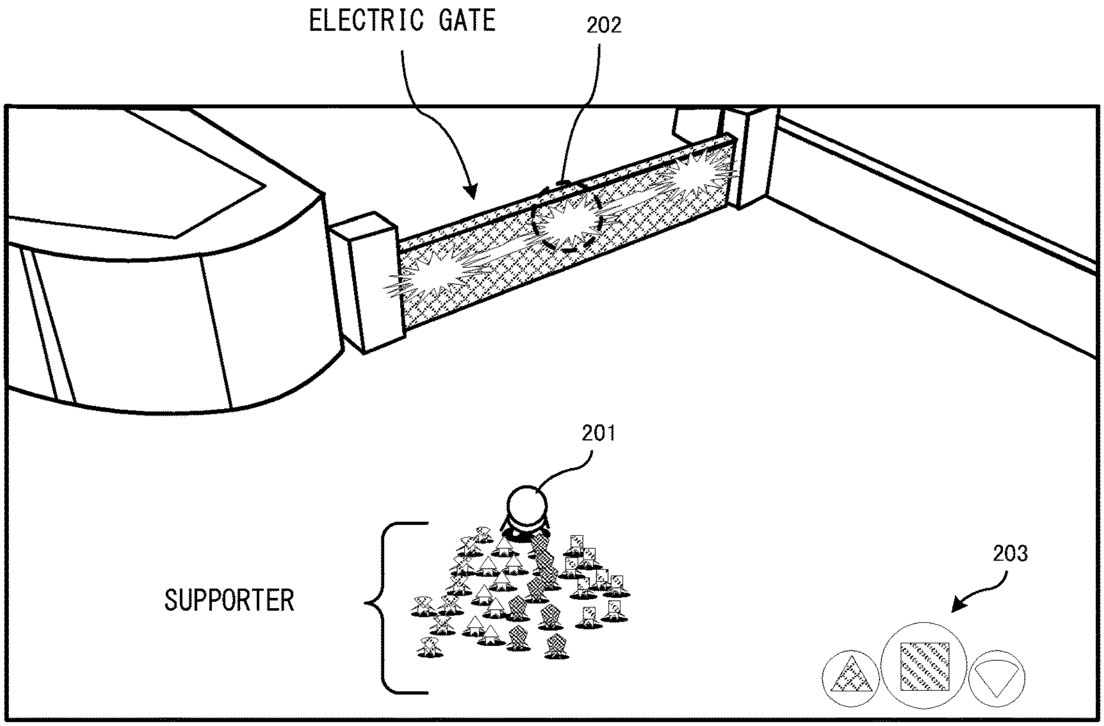
FIG. 17 shows a non-limiting example of the game screen according to the exemplary embodiment.
Figure 18:
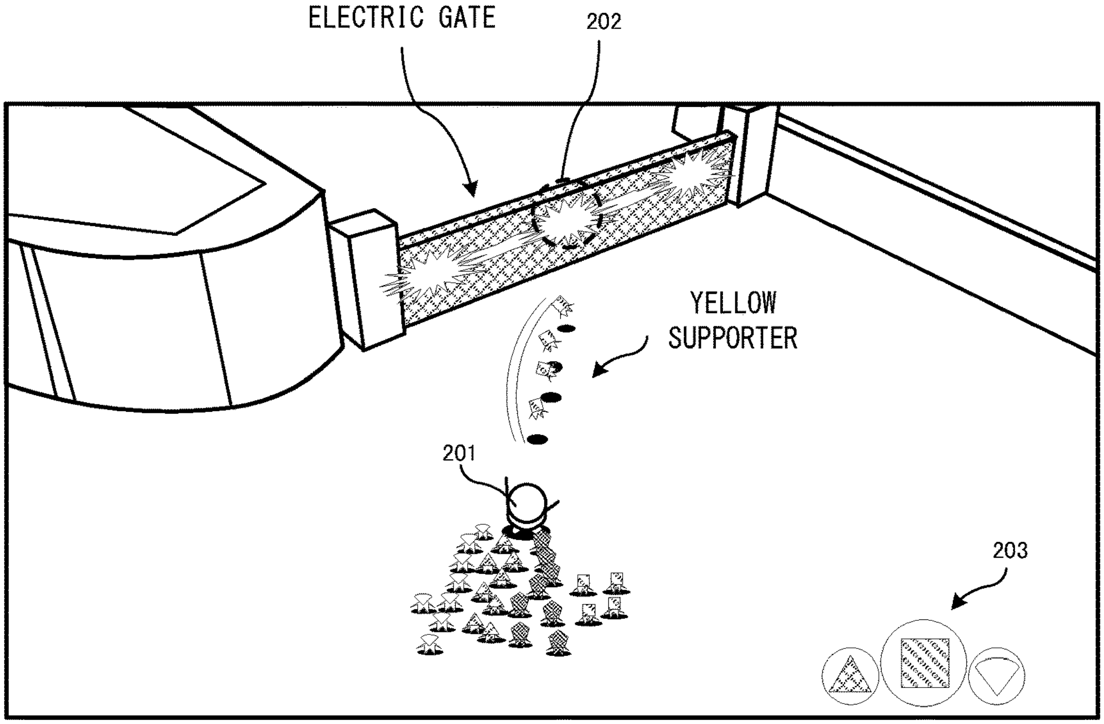
FIG. 18 shows a non-limiting example of the game screen according to the exemplary embodiment.

One example of the stopper control for the "electric gate" which is the above "type-limited type" obstacle object will be illustrated using screen examples. First, FIG. 17 shows a state where the "electric gate" is locked on. Also, the current throwing target type is the yellow supporters. In this state, when the user starts repeatedly pressing the A-button 53, the yellow supporters in the party are sequentially thrown toward the cursor 202 as shown in FIG. 18.

Figure 19:
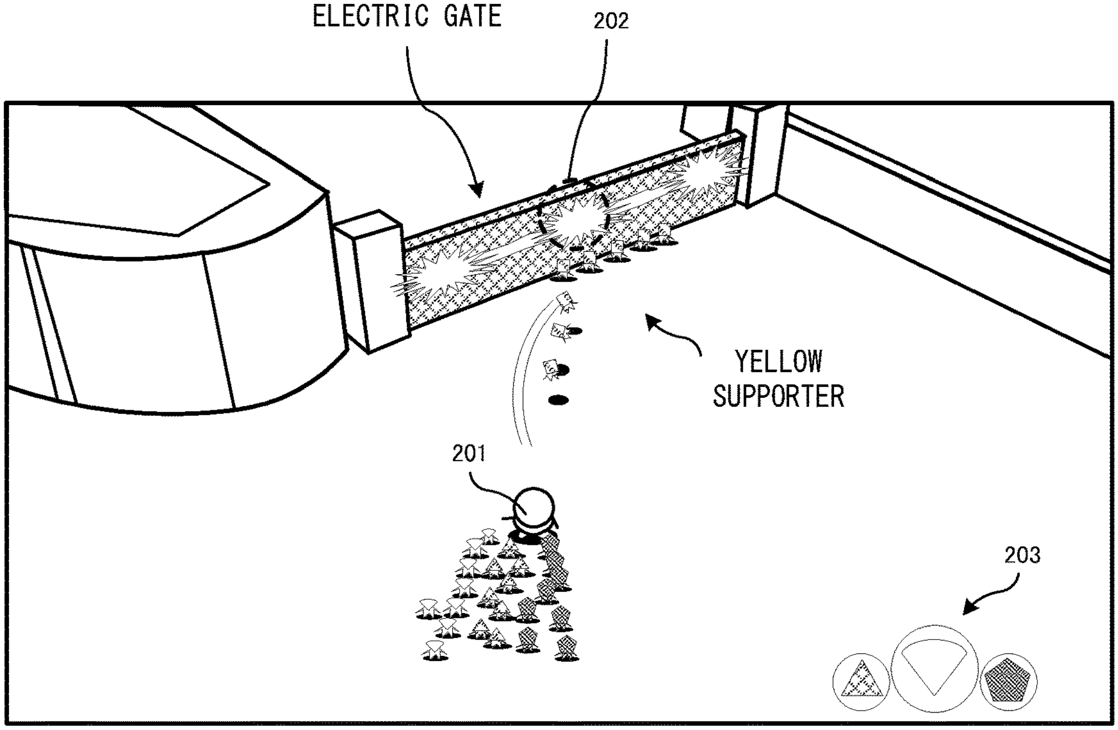
FIG. 19 shows a non-limiting example of the game screen according to the exemplary embodiment.
Figure 20:
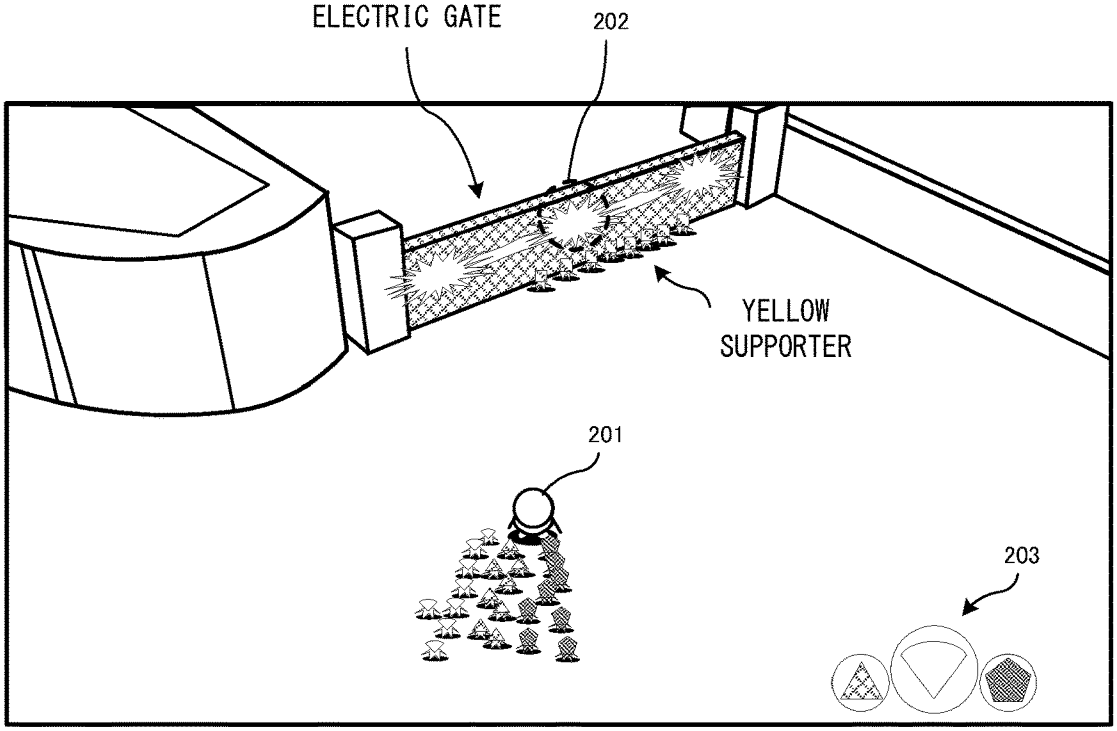
FIG. 20 shows a non-limiting example of the game screen according to the exemplary embodiment.

Then, when the remaining number of yellow supporters in the party reaches 0, a state shown in FIG. 19 arises. FIG. 19 shows that the throwing target type has been switched to the white supporters by the above automatic switching. That is, in the display of the switching guide 203, the face image in the center circular frame has been switched from that of the yellow supporters to that of the white supporters. Then, the above stopper is activated in accordance with the occurrence of this automatic switching. Therefore, in FIG. 19, the PC 201 has temporarily stopped the throwing action. In addition, in FIG. 19, some of the yellow supporters are still in the middle of movement related to the throwing (have not landed yet). Then, when these yellow supporters land and move to the place of duty, a state shown in FIG. 20 arises. At this time, the stopper is still activated. Therefore, the user can be given an uncomfortable feeling that throwing is not performed even though repeated pressing is performed, thereby making the user notice that all the yellow supporters have been thrown. Therefore, the user is given an option to stop the repeated pressing at this time.

Figure 21:
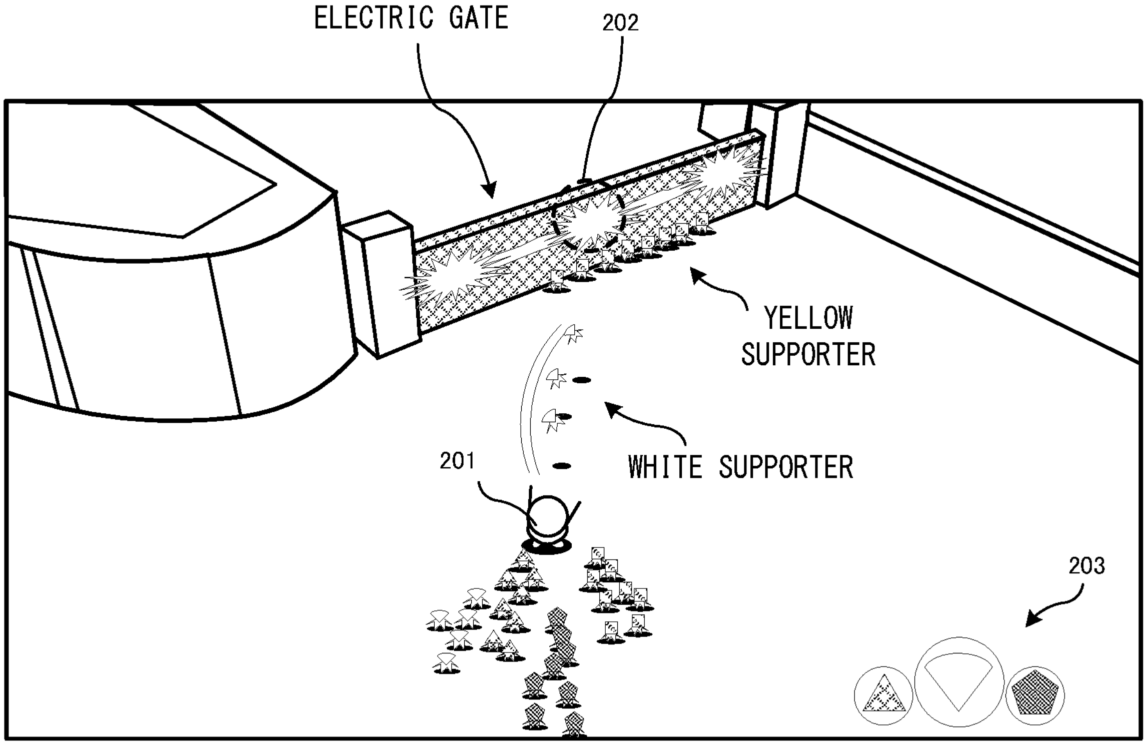
FIG. 21 shows a non-limiting example of the game screen according to the exemplary embodiment.

After the stopper is activated, if 1 second elapses as in the above without the user intentionally stopping the repeated pressing, the stopper is cancelled. As a result, as shown in FIG. 21, throwing of the white supporters is started. However, in this case, as described above for example, the white supporters are damaged by the "electric gate", which may cause a situation disadvantageous to the user.

As for the activation of the stopper for the above "type-limited type" work target, as in the case of the above transport body object, the stopper is activated only once during one repeated pressing period.

Details of Game Processing According to Exemplary Embodiment

Next, the game processing in the exemplary embodiment will described in more detail with reference to FIG. 22 to FIG. 40.

[Data to be Used]

Figure 22:
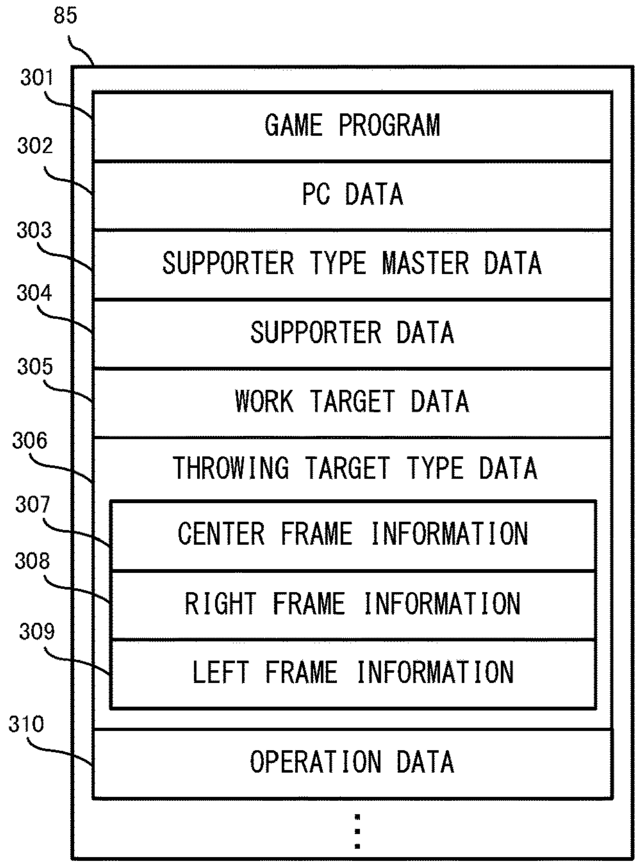
FIG. 22 illustrates a memory map showing a non-limiting example of various kinds of data stored in a DRAM 85.

First, various kinds of data to be used in the game processing will be described. FIG. 22 illustrates a memory map showing an example of various kinds of data stored in the DRAM 85 of the main body apparatus 2. In the DRAM 85 of the main body apparatus 2, a game program 301, PC data 302, supporter type master data 303, supporter data 304, work target data 305, throwing target type data 306, operation data 310, etc., are stored.

The game program 301 is a program for executing the game processing in the exemplary embodiment.

Figure 23:
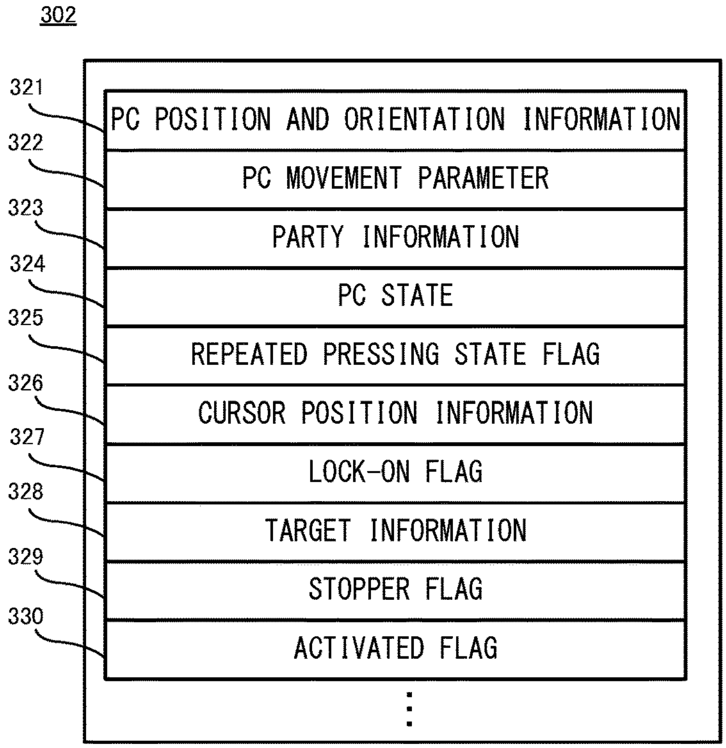
FIG. 23 shows a non-limiting example of PC data 302.

The PC data 302 is data regarding the above PC 201. FIG. 23 illustrates an example of the data structure of the PC data 302. The PC data 302 includes at least PC position and orientation information 321, a PC movement parameter 322, party information 323, a PC state 324, a repeated pressing state flag 325, cursor position information 326, a lock-on flag 327, target information 328, a stopper flag 329, and an activated flag 330.

The PC position and orientation information 321 is data indicating the current position and the current orientation of the PC 201 in the virtual space.

The PC movement parameter 322 is data used for controlling the movement of the PC 201. For example, the PC movement parameter 322 includes parameters indicating a movement direction, a movement speed, etc., of the PC 201.

The party information 323 is data that defines the content of the above party having the PC 201 as a leader. The party information 323 includes at least information for specifying the supporters that join the party. In addition, information indicating the remaining number of each type of supporters in the party (e.g., a counter for the remaining number) is also included.

The PC state 324 is information indicating the current action state of the PC 201. In this example, information indicating at least "waiting", "moving", or "throwing action" can be set.

The repeated pressing state flag 325 is a flag indicating whether or not the user is in a state of repeatedly pressing the A-button 53 (hereinafter, repeated pressing state). In other words, the repeated pressing state flag 325 is also a flag indicating whether or not the PC 201 is in a state of continuously throwing supporters. If the repeated pressing state flag 325 is ON, it indicates that the user is in the repeated pressing state.

The cursor position information 326 is information indicating the current position of the cursor 202 (associated with the PC 201).

The lock-on flag 327 is a flag indicating whether or not the current mode is the above lock-on mode.

The target information 328 is information for specifying a currently locked-on work target (target) in the case of the lock-on mode.

The stopper flag 329 is a flag indicating whether or not the above-described stopper is currently activated. If the stopper flag 329 is ON, it indicates that the stopper is activated.

The activated flag 330 is a flag for indicating whether or not the stopper has already been activated once within one repeated pressing period as described above. If the activated flag 330 is ON, it indicates that the stopper has already been activated once.

In addition, the PC data 302 includes various kinds of data for forming the appearance of the PC 201 (three-dimensional model data, texture data, etc.) and data that defines animations of various actions to be performed by the PC 201.

Referring back to FIG. 22, the supporter type master data 303 is data that defines the types of supporters, work powers, etc. FIG. 24 illustrates an example of the data structure of the supporter type master data 303. As shown in FIG. 24, the supporter type master data 303 is a database consisting of a set of records each including items such as supporter type information 331, work power information 332, and appearance data 333. The supporter type information 331 is information indicating one of the types of supporters. In this example, "red supporter", "blue supporter", "white supporter", or "yellow supporter" is stored in the supporter type information 331. The work power information 332 is information that defines the work power of each supporter of that type. The appearance data 333 is data for forming the appearance of each supporter of that type.

Referring back to FIG. 22, the supporter data 304 is data for managing each supporter. FIG. 25 illustrates an example of the data structure of the supporter data 304. The supporter data 304 is a database consisting of a set of records each including items shown in FIG. 25. In FIG. 25, each record includes at least items such as a supporter ID 341, supporter type information 342, supporter position and orientation information 343, an affiliation state 344, a supporter action state 345, and an action parameter 346.

The supporter ID 341 is an ID for uniquely identifying each supporter. The supporter type information 342 is information indicating which of the above four types the supporter is, and is information corresponding to the supporter type information 331 of the supporter type master data 303.

The supporter position and orientation information 343 is information indicating the current position and the current orientation of the supporter in the virtual game space.

The affiliation state 344 is data indicating whether or not the supporter currently belongs to the party of the PC 201. In this example, as the content of this data, "PC" is set if the supporter belongs to the party of the PC 201, and "not belonging" is set if the supporter does not belong to the party of the PC 201.

The supporter action state 345 is data indicating the current action state of the supporter. As the state of the supporter, for example, "waiting", "moving", "work waiting", "working", etc., are set. Supplementary description will be given regarding each state. When the supporter is thrown, "work waiting" is set as a state until the supporter reaches the above "place of duty". Then, when the supporter reaches the "place of duty", "working" is set. In the case of "working", the supporter performs a predetermined action (the above transporting action, destroying action, or the like) corresponding to the work target. In addition, when the supporter is moving so as to follow the PC 201, "moving" is set, and when the supporter is not moving but is waiting, "waiting" is set. In addition, when the predetermined action is completed in the state of "working" (when the transport body object is transported to the destination or when destruction of an obstacle is finished), "waiting" is set.

The action parameter 346 includes various parameters for controlling the action of the supporter, and parameters corresponding to the content of the supporter action state 345 are set as appropriate. For example, if the supporter action state 345 is "moving" or "work waiting", parameters indicating a movement direction and a movement speed are set. In addition, if the supporter action state 345 is "working", parameters corresponding to the action to be executed are set. For example, in the case of the transporting action, parameters of a movement direction and a movement speed for transport are set. In addition, in the case of the destroying action, parameters of an attack power (destructive power) to be given to the work target, an attack speed, and an attack position are set.

In addition, although not shown, each record of the supporter data 304 may include, for example, various kinds of information required for the game processing, such as the hit point (HP), etc., of each supporter.

Referring back to FIG. 22, the work target data 305 is data for managing the work targets. Specifically, the work target data 305 is a database consisting of a set of records each including items shown in FIG. 26. In FIG. 26, each record includes at least items such as a work target ID 351, first classification information 352, required work power information 353, operating power information 354, waiting power information 355, a stopper invalidity flag 356, second classification information 357, workable type information 358, work target position and orientation information 359, and appearance data 360.

The work target ID 351 is an ID that uniquely identifies each work target.

The first classification information 352 is information indicating whether the work target related to the record is “required power set type” or “required power non-set type”. The required work power information 353 is information that defines the required work power when the work target is “required power set type”. The operating power information 354 is the total value of the work powers (hereinafter, operating powers) of supporters whose supporter states are “working”, for the work target. The waiting power information 355 is the total value of the work powers (hereinafter, waiting powers) of supporters whose supporter states are “work waiting”, for the work target.

The stopper invalidity flag 356 is a flag indicating whether or not the work target related to the record is a “required power set type” work target and the above-described required work power thereof is “1”. As described above, the stopper is not activated for such a work target, and thus an attribute of stopper invalidity is set by the flag. If the stopper invalidity flag 356 is ON, it indicates the work target is a work target having a required work power of “1” (a work target for which the stopper is not activated).

The contents of the required work power information 353, the operating power information 354, the waiting power information 355, and the stopper invalidity flag 356 are set only for the “required power set type” work targets. For the “required power non-set type” work targets, for example, Null values may be set for these items.

The second classification information 357 is information indicating whether the work target related to the record is the above “type-limited type” or “type-unlimited type”. The workable type information 358 is information specifying the type of supporters capable of performing a predetermined action on the work target related to the record when the work target is the above “type-limited type”. The workable type information 358 is set only when the work target is the above “type-limited type”, and, in the other case, for example, a Null value may be set.

The work target position and orientation information 359 is information indicating the current position and orientation of the work target related to the record in the virtual space. The appearance data 360 is various kinds of data for forming the appearance of the work target.

In addition, although not shown, work target data 305 may include information that defines the weight, characteristics, etc., of each work target, etc.

Referring back to FIG. 22, the throwing target type data 306 is data indicating which type the current throwing target type is, and is data for managing the display content of the switching guide 203. The throwing target type data 306 includes center frame information 307, right frame information 308, and left frame information 309 which are information corresponding to the three circular frames of the switching guide 203, respectively. The center frame information 307 includes information specifying the throwing target type to be displayed in the center circular frame of the switching guide 203. In addition, the center frame information 307 is also information indicating the current throwing target type. The right frame information 308 includes information specifying the throwing target type to be displayed in the right circular frame of the switching guide 203, and the left frame information 309 includes information specifying the throwing target type to be displayed in the left circular frame of the switching guide 203.

Figure 27:
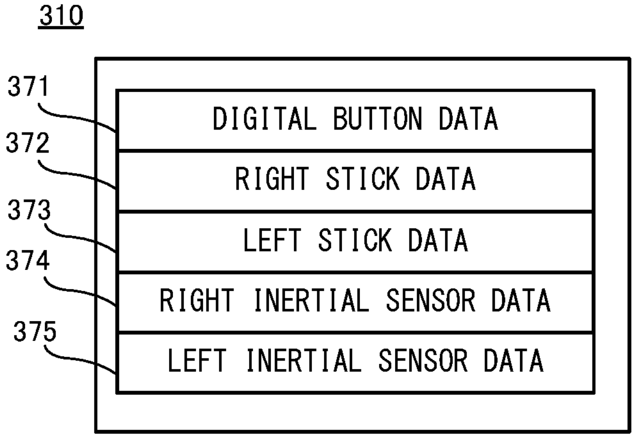
FIG. 27 shows a non-limiting example of operation data 310.

The operation data 310 is data obtained from the controller operated by the user. That is, the operation data 310 is data indicating the content of an operation performed by the user. FIG. 27 illustrates an example of the data structure of the operation data 310. The operation data 310 includes at least digital button data 371, right stick data 372, left stick data 373, right inertial sensor data 374, and left inertial sensor data 375. The digital button data 371 is data indicating pressed states of various buttons of the controllers. The right stick data 372 is data for indicating the content of an operation on the right stick 52. Specifically, the right stick data 372 includes two-dimensional data of x and y. The left stick data 373 is data for indicating the content of an operation on the left stick 32. The right inertial sensor data 374 is data indicating the detection results of the inertial sensors such as the acceleration sensor 114 and the angular velocity sensor 115 of the right controller 4. Specifically, the right inertial sensor data 374 includes acceleration data for three axes and angular velocity data for three axes. The left inertial sensor data 375 is data indicating the detection results of the inertial sensors such as the acceleration sensor 104 and the angular velocity sensor 105 of the left controller 3.

In addition, various kinds of data required for the game processing are also generated as appropriate and stored in the DRAM 85.

[Details of Processing Executed by Processor 81]

Next, the details of the game processing in the exemplary embodiment will be described. Here, control related to the above-described throwing operation will be mainly described, and the detailed description of other various kinds of game processing is omitted. In the exemplary embodiment, flowcharts described below are realized by one or more processors reading and executing the above program stored in one or more memories. The flowcharts are merely an example of the processing. Therefore, the order of each process step may be changed as long as the same result is obtained. In addition, the values of variables and thresholds used in determination steps are also merely examples, and other values may be used as necessary.

Figure 28:
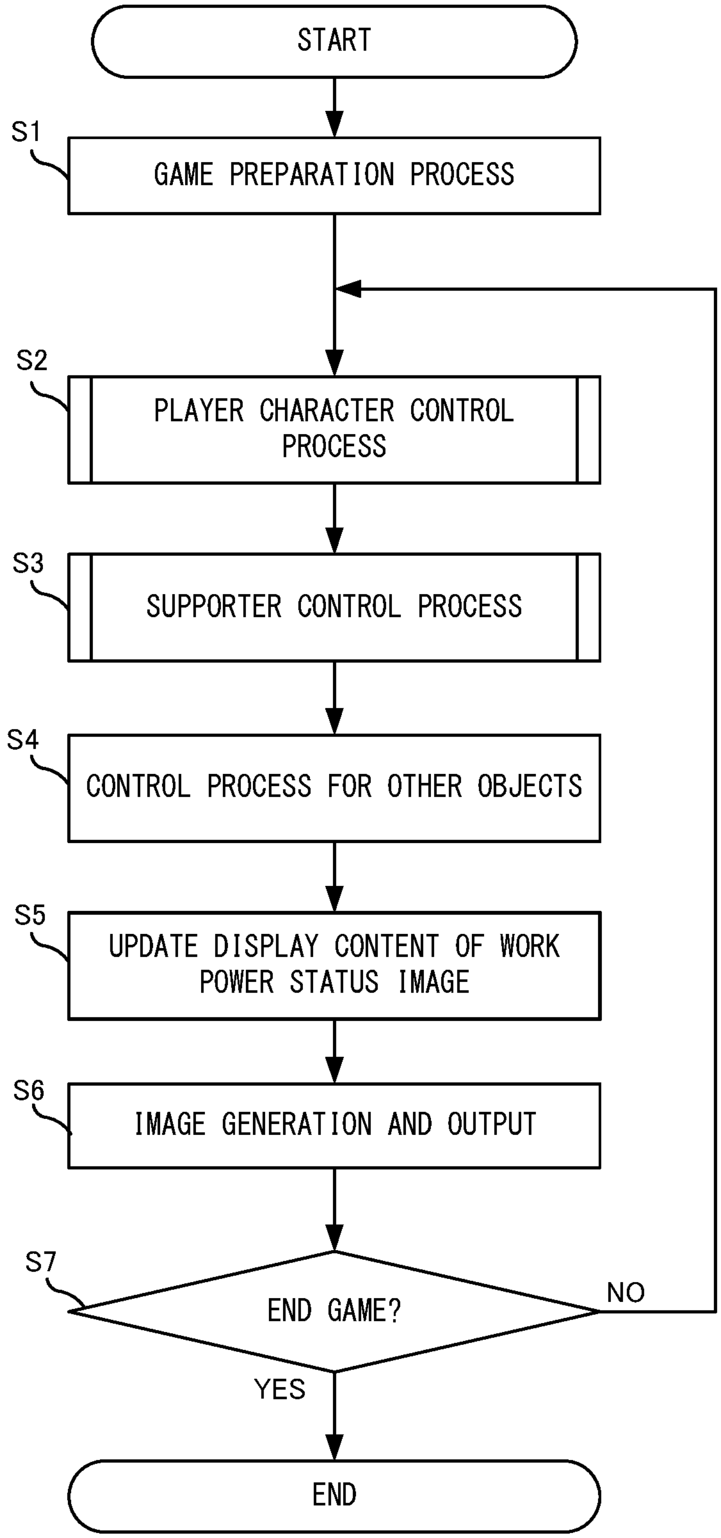
FIG. 28 is a flowchart showing the details of game processing according to the exemplary embodiment.

FIG. 28 is a flowchart showing the details of the game processing according to the exemplary embodiment. A process loop of steps S2 to S7 in FIG. 28 is repeatedly executed every frame period. In the exemplary embodiment, a description will be given on the assumption that a frame rate is 30 fps.

[Preparation of Game]

In FIG. 28, in step S1, the processor 81 executes a game preparation process. In this process, the processor 81 constructs a virtual space and places the PC 201, the supporters, and various work targets therein as appropriate. Then, the processor 81 takes an image of the virtual space with the virtual camera to generate a game image, and outputs the game image. In addition, the processor 81 loads various kinds of data required for the game processing, into the DRAM 85, and initializes variable data such as various flags and variables as appropriate.

[Control for PC 201]

Figure 29:
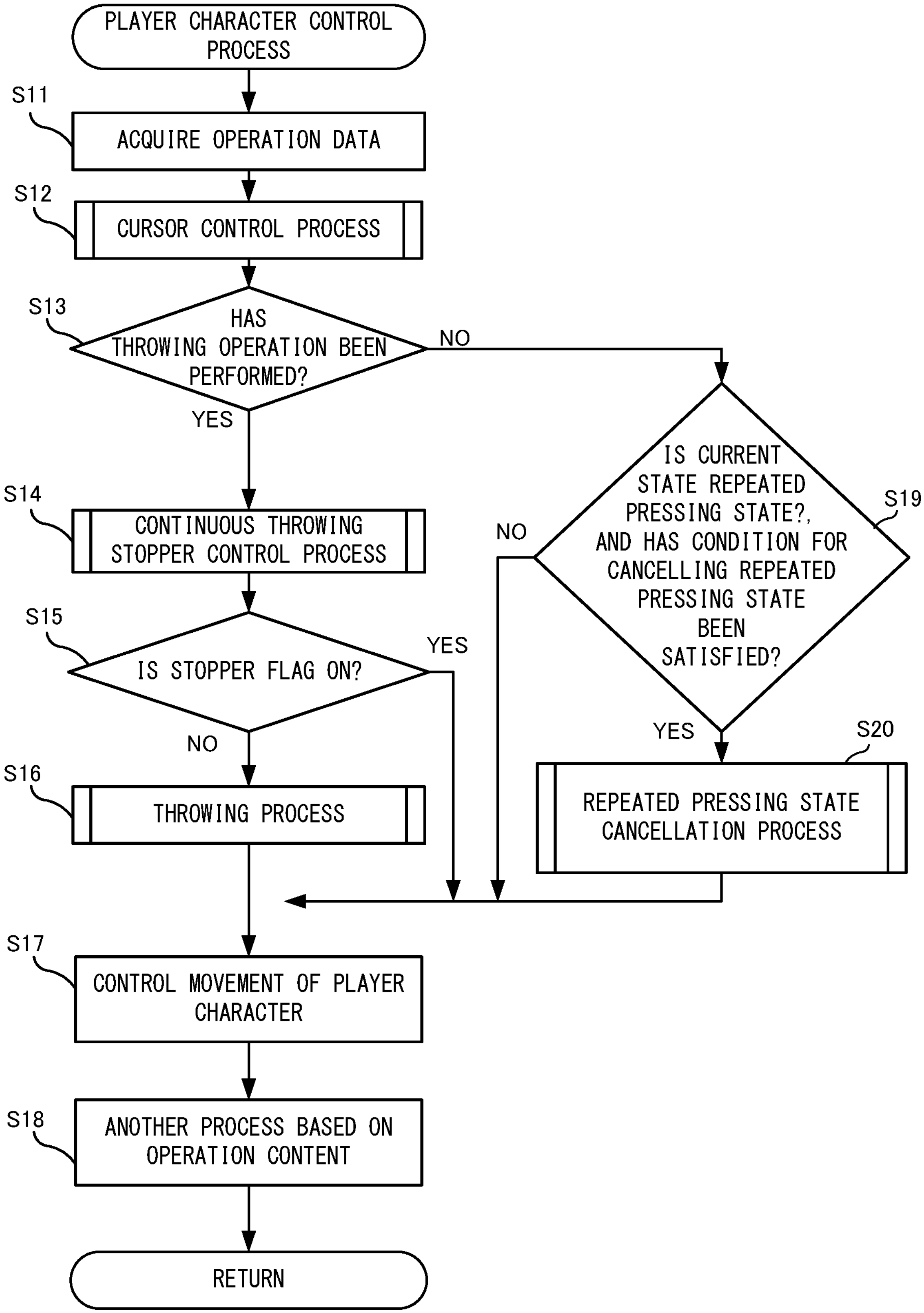
FIG. 29 is a flowchart showing the details of a player character control process.

Next, in step S2, the processor 81 executes a player character control process. In this process, a process for reflecting the content of an operation by the user in the action of the PC 201 is performed. FIG. 29 is a flowchart showing the details of the player character control process. First, in step S11, the processor 81 acquires the operation data 310. Next, in step S12, the processor 81 executes a cursor control process for controlling the movement of the cursor 202.

Figure 30:
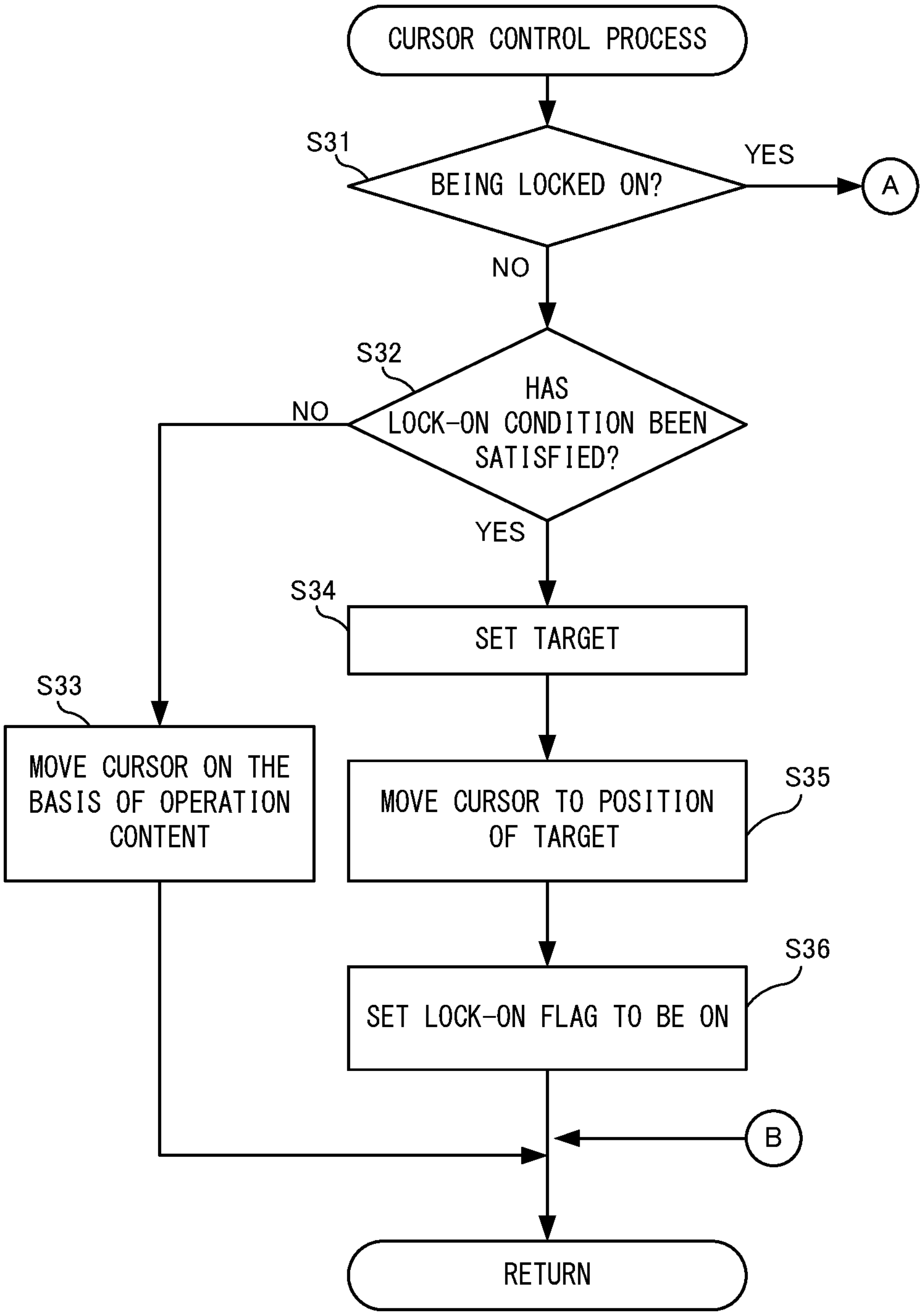
FIG. 30 is a flowchart showing the details of a cursor control process.
Figure 31:
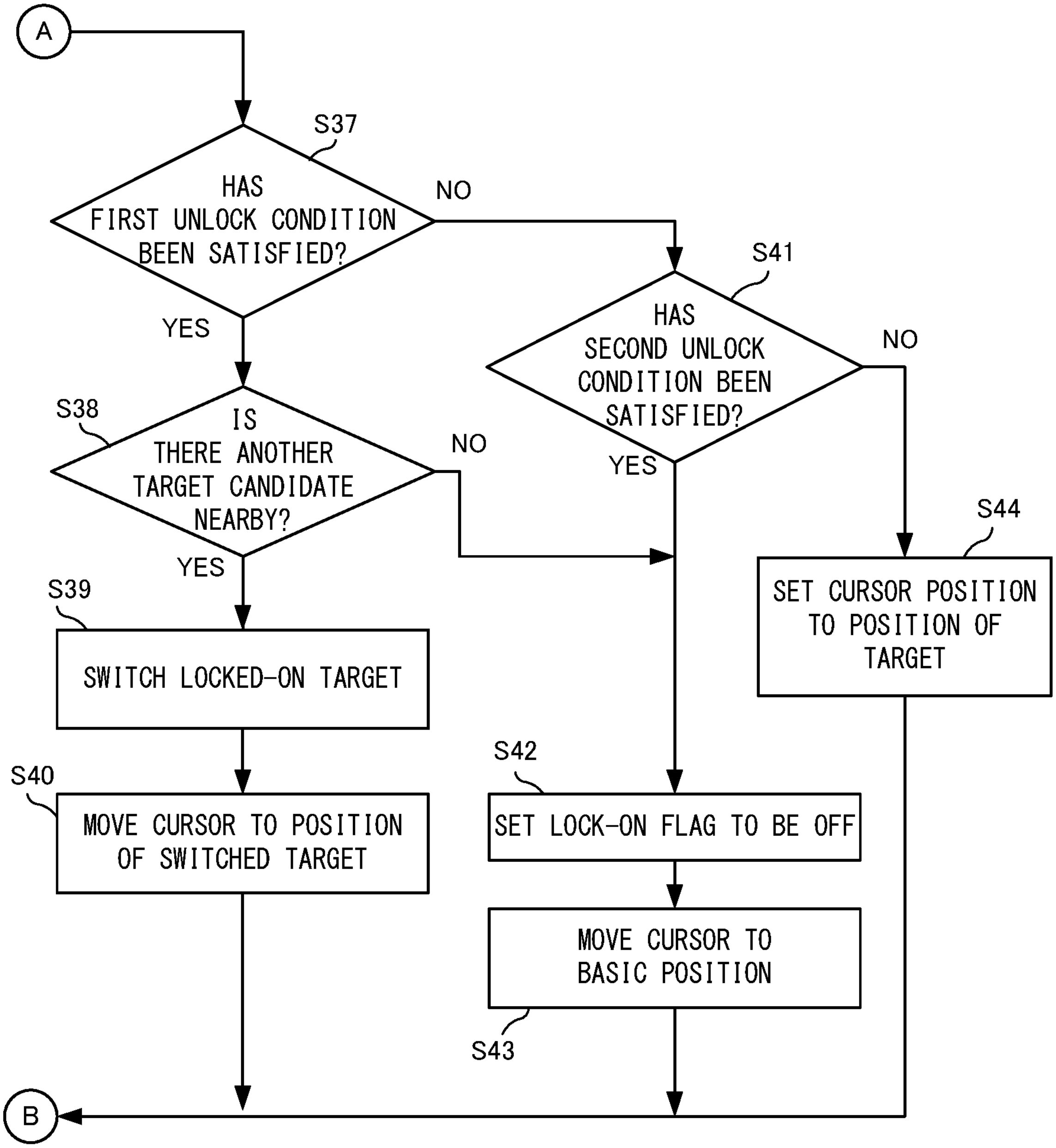
FIG. 31 is a flowchart showing the details of the cursor control process.

FIG. 30 and FIG. 31 are flowcharts showing the details of the cursor control process. In FIG. 30, first, in step S31, the processor 81 refers to the lock-on flag 327 and determines whether or not the current mode is the lock-on mode. If the current mode is not the lock-on mode (NO in step S31), in step S32, the processor 81 determines whether or not a condition for shifting to the lock-on mode has been satisfied. In this example, this condition is that the user presses the ZR-button 61 (lock-on button) in a state where a predetermined work target is located in a predetermined range from the cursor 202.

As a result of the determination, if the condition for shifting to the lock-on mode has not been satisfied (NO in step S32), in step S33, the processor 81 moves the cursor 202 on the basis of the operation content indicated by the operation data 310. Then, the processor 81 ends the cursor control process.

On the other hand, as a result of the determination, if the condition for shifting to the lock-on mode has been satisfied (YES in step S32), in step S34 the processor 81 determines a target to be locked on, and sets this target in the target information 328. For example, the work target that is closest to the cursor 202 is determined as the target.

Next, in step S35, the processor 81 sets a predetermined position at which the cursor 202 is superimposed on the target, as the cursor position information 326. In subsequent step S36, the processor 81 sets the lock-on flag 327 to be ON. Then, the processor 81 ends the cursor control process.

Next, processing in the case where, as a result of the determination in step S31 above, the current mode is the lock-on mode, will be described. In this case, in step S37 in FIG. 31, the processor 81 determines whether or not a first unlock condition for cancelling the lock-on mode has been satisfied. The first unlock condition is specifically that the target is a "required power set type" work target and the required work power thereof is satisfied. As a result of the determination, if the first unlock condition has been satisfied (YES in step S37), next, in step S38, the processor 81 determines whether or not any other work target that can be a target is present near the current target. As a result of the determination, if such a work target is not present (NO in step S38), the processor 81 advances the processing to step S42 described later.

On the other hand, if any other work target that can be a target is present (YES in step S38), in step S39, the processor 81 switches the target to the other work target. At this time, when a plurality of such other work targets are present, the work target that is closest to the current target is selected as a switching destination. Then, the processor 81 sets information specifying the work target that is the switching destination, in the target information 328.

Next, in step S40, the processor 81 sets the position of the target after switching, as the cursor position information 326. Then, the processor 81 ends the cursor control process.

On the other hand, as a result of the determination in step S37 above, if the first unlock condition has not been satisfied (NO in step S37), in step S41, the processor 81 determines whether or not a second unlock condition has been satisfied. The second unlock condition is specifically that the user performs an operation for unlocking or the distance between the PC 201 and the current target becomes equal to or larger than a predetermined distance. As a result of the determination, if the second unlock condition has been satisfied (YES in step S41), in step S42, the processor 81 sets the lock-on flag 327 to be OFF. In subsequent step S43, the processor 81 sets the above basic position as the cursor position information 326. Then, the processor 81 ends the cursor control process.

On the other hand, if the second unlock condition has not been satisfied (NO in step S41), in step S44, the processor 81 sets the position of the target as the cursor position information 326. That is, the processor 81 controls the cursor 202 so as to continue to fix the cursor 202 to the target (continue a locked-on state). Then, the processor 81 ends the cursor control process.

Referring back to FIG. 29, next, in step S13, the processor 81 determines whether or not a throwing operation has been performed, in this example, the A-button 53 has been pressed (once). As a result of the determination, if the throwing operation has been performed (YES in step S13), in step S14, the processor 81 executes a continuous throwing stopper control process.

Figure 32:
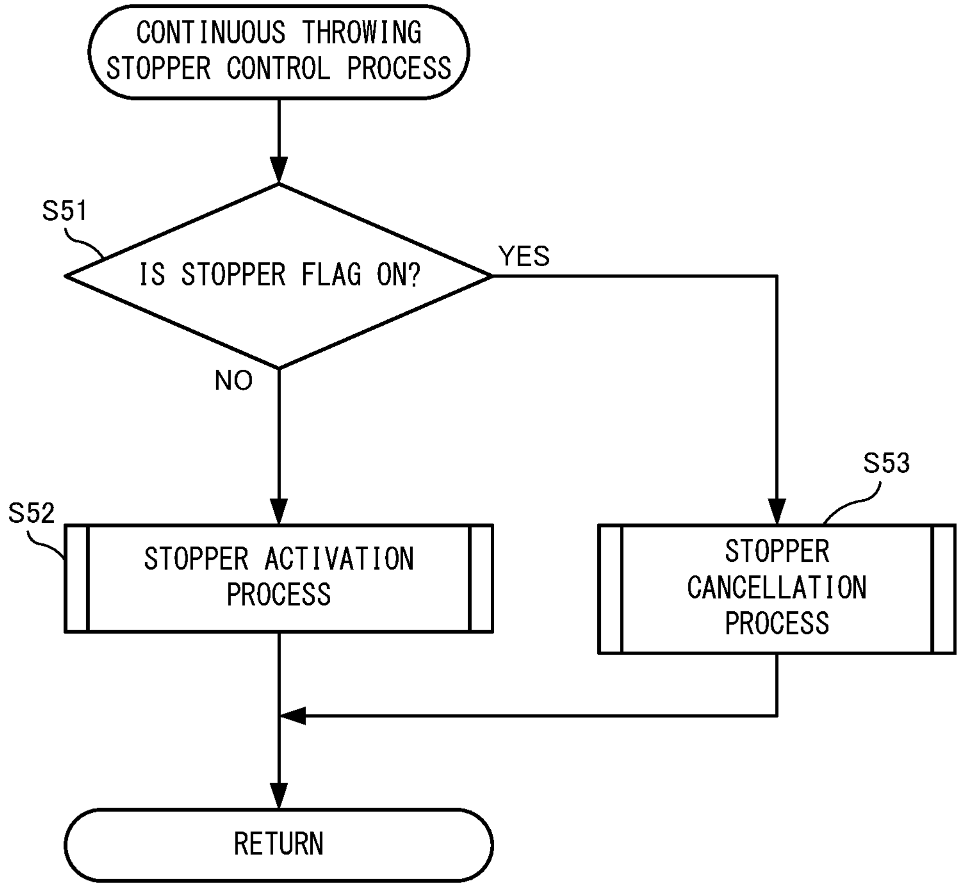
FIG. 32 is a flowchart showing the details of a continuous throwing stopper control process.

FIG. 32 is a flowchart showing the details of the continuous throwing stopper control process. In FIG. 32, first, in step S51, the processor 81 determines whether or not the stopper flag 329 is ON. If the stopper flag 329 is not ON (NO in step S51), in step S52, the processor 81 executes a stopper activation process. On the other hand, if the stopper flag 329 is ON (YES in step S51), in step S53, the processor 81 executes a stopper cancellation process. Then, the processor 81 ends the continuous throwing stopper control process. Hereinafter, each of these processes will be described.

Figure 33:
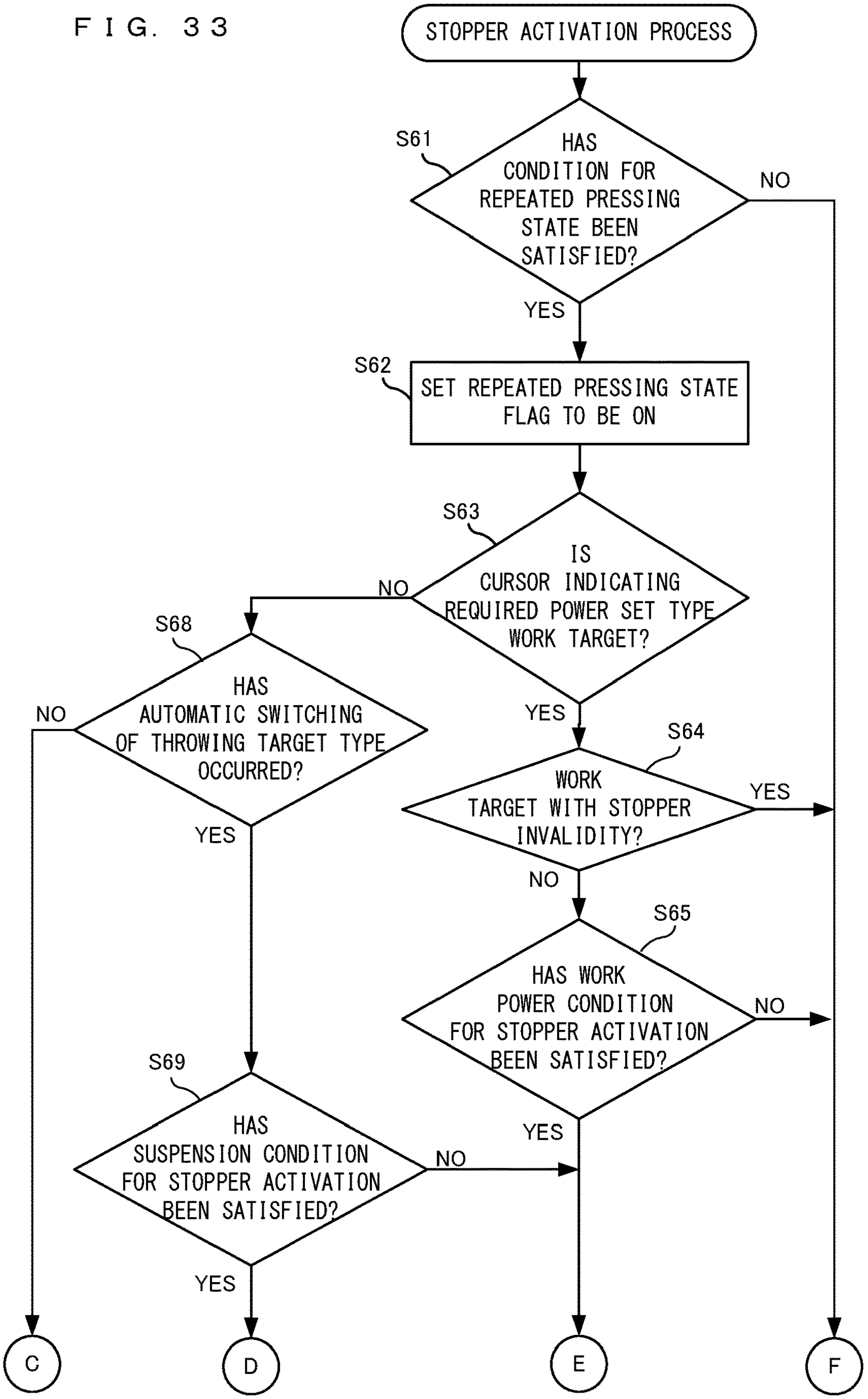
FIG. 33 is a flowchart showing the details of a stopper activation process.
Figure 34:
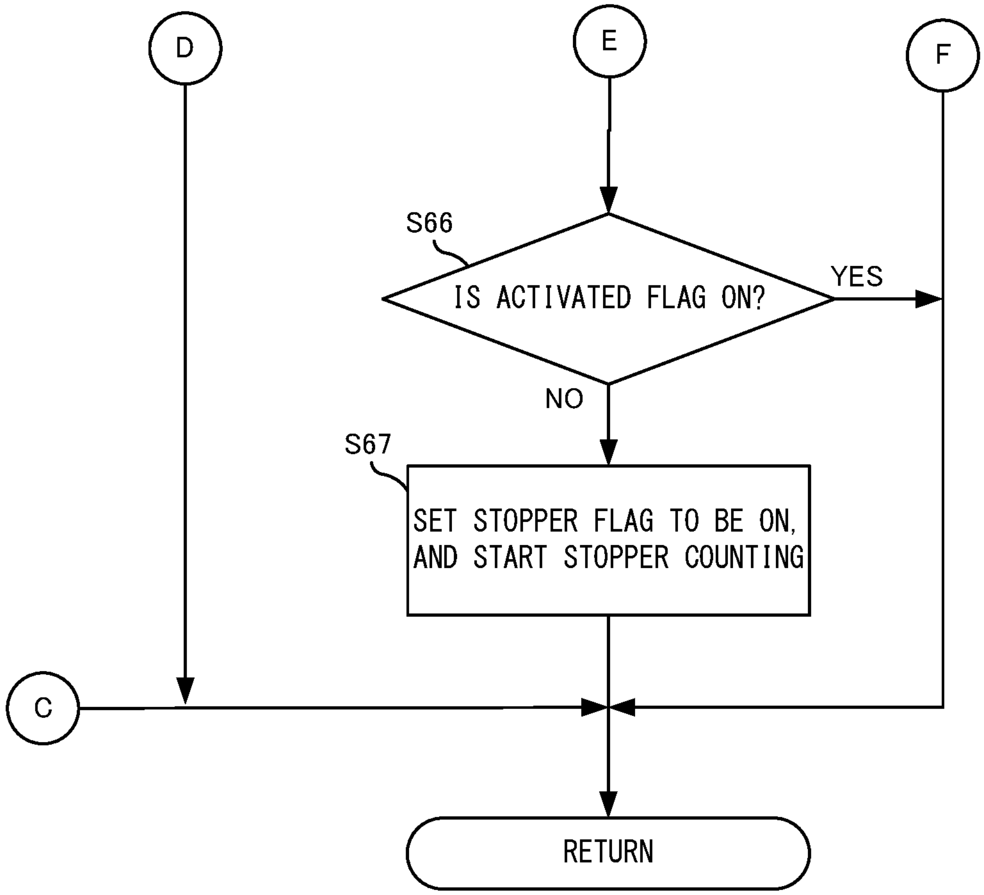
FIG. 34 is a flowchart showing the details of the stopper activation process.

FIG. 33 and FIG. 34 are flowcharts showing the details of the above stopper activation process. In FIG. 33, first, in step S61, the processor 81 determines whether or not a condition for determining the current state is a state where repeated pressing (of the A-button 53) is being performed (hereinafter, repeated pressing state) has been satisfied, on the basis of the operation data 310. In the exemplary embodiment, since a description is given on the assumption that one frame is 1/30 seconds (30 fps), for example, if the current input of the A-button 53 is an input within 10 frames from the frame in which the previous input of the A-button 53 is detected, it is determined that the current state is the repeated pressing state. That is, in the exemplary embodiment, if a situation in which the A-button 53 is repeatedly inputted within 10 frames continues, the current state is treated as the repeated pressing state.

As a result of the determination, if the condition for determining that the current state is the repeated pressing state has not been satisfied (NO in step S61), the processor 81 ends the stopper activation process. On the other hand, if this condition has been satisfied (YES in step S61), in step S62, the processor 81 sets the repeated pressing state flag 325 to be ON.

Next, in step S63, the processor 81 determines whether or not the cursor 202 is indicating a "required power set type" work target (in this example, the above transport body object). That is, it is determined whether or not the current target is a "required power set type" work target. As a result of the determination, if the cursor 202 is indicating a "required power set type" work target (YES in step S63), next, in step S64, the processor 81 determines whether or not the stopper invalidity flag 356 for the work target indicated by the cursor 202 is ON. That is, it is determined whether or not the current target is a work target having an attribute of "stopper invalidity". As a result of the determination, if the current target is a work target having an attribute of "stopper invalidity" (YES in step S64), the processor 81 ends the stopper activation process. That is, in this case, the stopper is not activated.

On the other hand, as a result of the determination, if the current target is not a work target having an attribute of "stopper invalidity" (NO in step S64), in step S65, the processor 81 determines whether or not a work power condition for activating the stopper has been satisfied. Specifically, first, the processor 81 acquires the required work power information 353, the operating power information 354, and the waiting power information 355 of the current target. Next, the processor 81 calculates the total value of the operating power and the waiting power on the basis of the acquired information. Then, the processor 81 determines whether or not the total value is equal to or larger than the required work power. If the total value is equal to or larger than the required work power, the processor 81 determines that the work power condition for activating the stopper has been satisfied.

As a result of the determination, if the work power condition has not been satisfied (NO in step S65), the processor 81 ends the stopper activation process. On the other hand, if the work power condition has been satisfied (YES in step S65), in step S66 in FIG. 34, the processor 81 determines whether or not the activated flag 330 is ON. That is, the process 81 determines whether or not the stopper has already been activated once during a repeated pressing period related to the current repeated pressing state. As a result of the determination, if the activated flag 330 is ON (YES in step S66), the processor 81 ends the stopper activation process. That is, in this case, the stopper is not activated. On the other hand, if the activated flag 330 is OFF (NO in step S66), in step S67, the processor 81 sets the stopper flag 329 to be ON, and starts counting the elapsed time during stopper activation (hereinafter, referred to as stopper counting). Then, the processor 81 ends the stopper activation process.

On the other hand, as a result of the determination in step S63 above, if the cursor 202 is not indicating a "required power set type" work target (NO in step S63), it is determined that the current target is a "required power non-set type" work target (in this example, the above obstacle object). In this case, in step S68, the processor 81 determines whether or not the above-described automatic switching has occurred for the throwing target type (more precisely, it is determined whether or not an automatic switching process has been performed in a throwing process (described later) in the immediately previous frame). As a result of the determination, if automatic switching of the throwing target type has not occurred (NO in step S68), the processor 81 ends the stopper activation process. On the other hand, if automatic switching of the throwing target type has occurred (YES in step S68), in step S69, the processor 81 determines whether or not a suspension condition for stopper activation has been satisfied. The suspension condition is a condition for suspending activation of the stopper, and is specifically that the current target is a "type-unlimited type" work target. That is, the suspension condition is a condition for performing control in which, in principle, the stopper is activated if automatic switching occurs, but the stopper is not activated if the target is a "type-unlimited type". This is to improve the operation response by not activating the stopper if a disadvantageous situation such as damage does not occur even when continuous throwing is continued.

As a result of the determination, if the suspension condition has not been satisfied, that is, the current target is "type-limited type" (NO in step S69), the processor 81 advances the processing to step S66 above. That is, control in which the stopper is activated if the stopper has not already been activated during the current repeated pressing period and the stopper is not activated if the stopper has already been activated once during the current repeated pressing period, is performed. On the other hand, as a result of the determination, if the suspension condition has been satisfied (YES in step S69), the processor 81 ends the stopper activation process. That is, in this case, the stopper is not activated. This is the end of the description of the stopper activation process.

Figure 35:
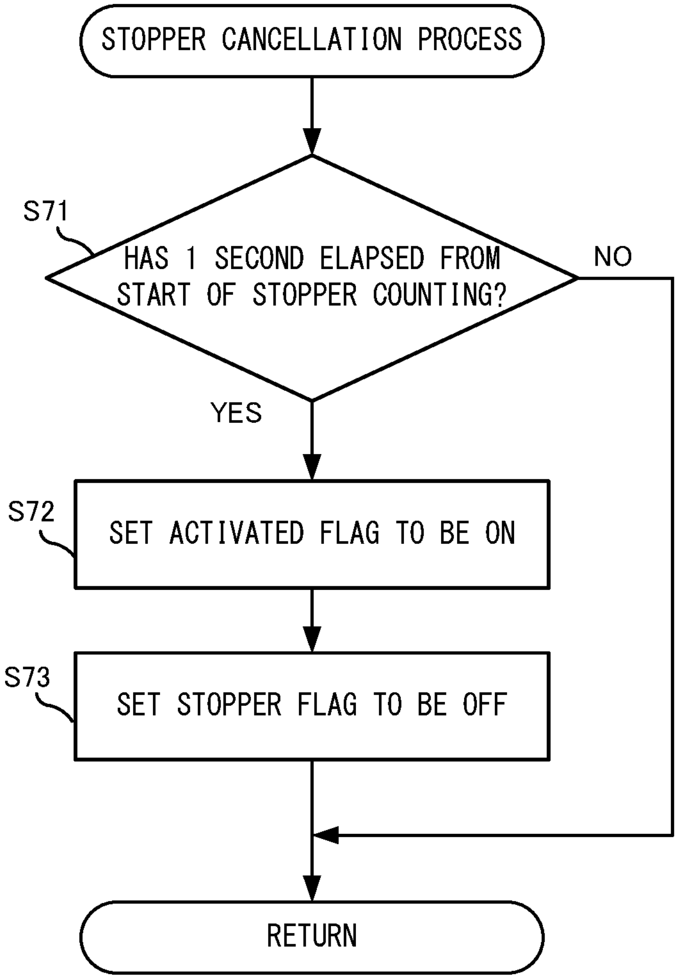
FIG. 35 is a flowchart showing the details of a stopper cancellation process.

Next, the stopper cancellation process will be described. This process is a process for cancelling the stopper if 1 second elapses (in the repeated pressing state) after the stopper is activated. FIG. 35 is a flowchart showing the details of the stopper cancellation process. In FIG. 35, first, in step S71, the processor 81 determines whether or not 1 second has elapsed (in the repeated pressing state) from the start of the above stopper counting. As a result of the determination, if 1 second has not elapsed (NO in step S71), the processor 81 ends the stopper cancellation process. On the other hand, if 1 second has elapsed (YES in step S71), in step S72, the processor 81 sets the activated flag 330 to be ON. Next, in step S73, the processor 81 sets the stopper flag 329 to be OFF. Then, the processor 81 ends the stopper cancellation process. This is the end of the description of the stopper cancellation process.

Referring back to FIG. 29, next, in step S15, the processor 81 determines whether or not the stopper flag 329 is ON. As a result of the determination, if the stopper flag 329 is not ON (NO in step S15), in step S16, the processor 81 executes a throwing process for causing the PC 201 to perform the above throwing action. On the other hand, if the stopper flag 329 is ON (YES in step S15), the throwing process is skipped, and the processor 81 advances the processing to the next step.

[Throwing Process]

Figure 36:
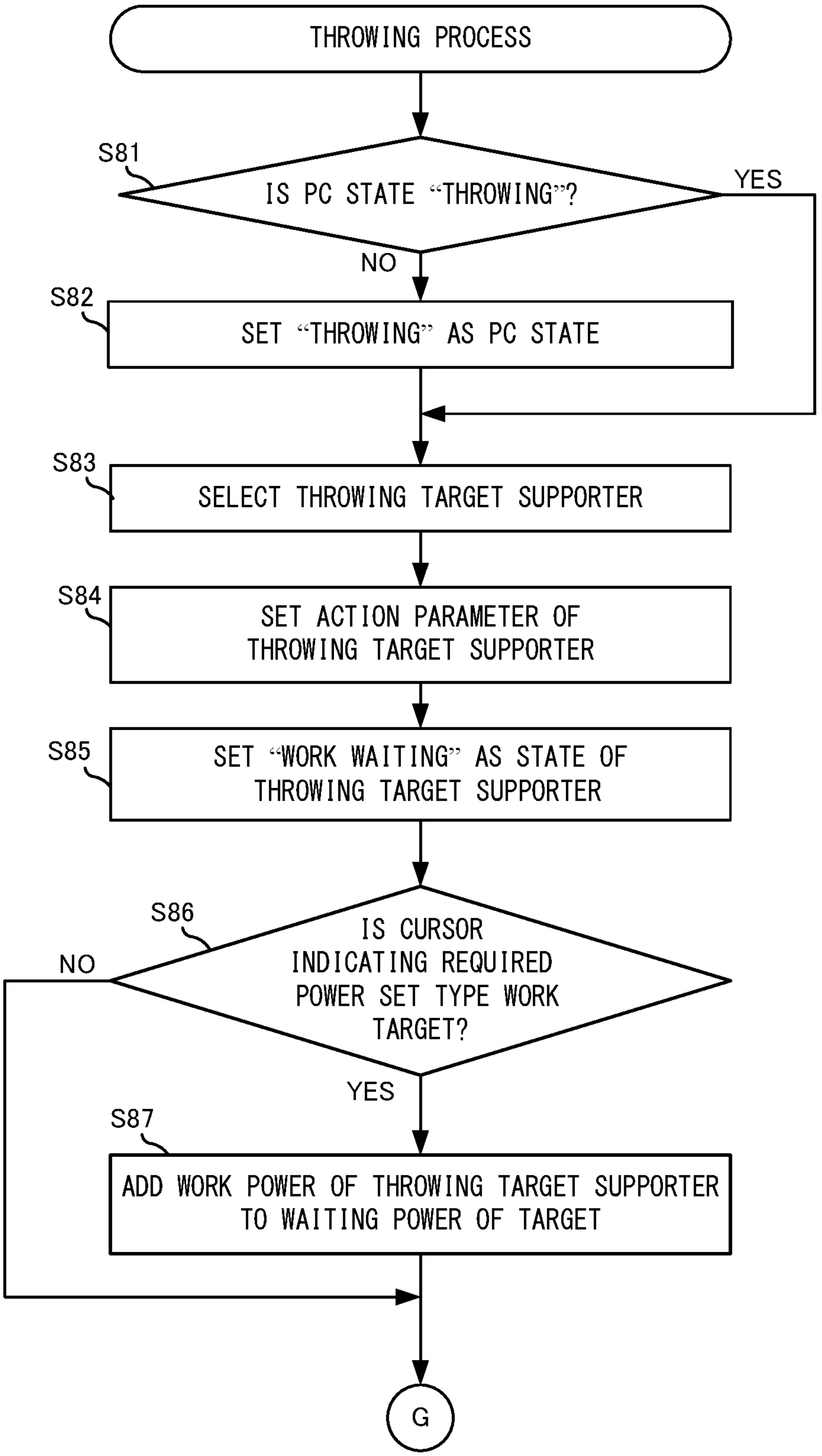
FIG. 36 is a flowchart showing the details of a throwing process.
Figure 37:
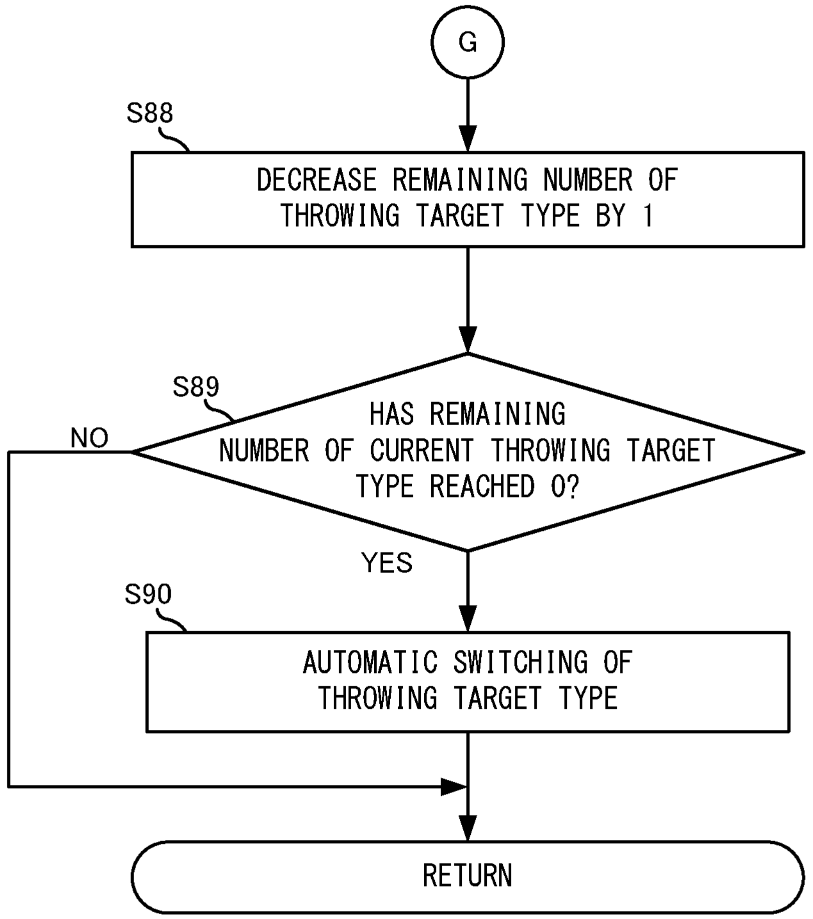
FIG. 37 is a flowchart showing the details of the throwing process.

FIG. 36 and FIG. 37 are flowcharts showing the details of the throwing process. In FIG. 36, first, in step S81, the processor 81 determines whether or not the PC state 324 is "throwing". If the PC state 324 is not "throwing", the processor 81 sets "throwing" as the PC state 324 in step S82. Accordingly, an animation for the throwing action is reproduced. On the other hand, if the PC state 324 is already "throwing", the process in step S82 is skipped.

Next, in step S83, the processor 81 selects one throwing target supporter from the current throwing target type in the party (this selection method may be any method).

Next, in step S84, the processor 81 sets the content of the action parameter 346 related to the supporter selected as a target to be thrown. This parameter can be set as appropriate in accordance with the work target that is the throwing destination, and the position of the cursor 202. Specifically, the landing point, the position of the above-described "place of duty", a movement trajectory based on these positions, etc., are set as parameters for movement. In addition, various parameters indicating the content of the action (transporting action, destroying action, etc.) to be taken by the supporter are set in accordance with the work target that is the throwing destination.

Next, in step S85, the processor 81 sets "work waiting" as the supporter action state 345 corresponding to the throwing target supporter.

Next, in step S86, the processor 81 determines whether or not the cursor 202 is indicating a "required power set type" work target. That is, it is determined whether or not the target is the transport body object. As a result of the determination, if the cursor 202 is indicating a "required power set type" work target (YES in step S86), in step S87, the processor 81 adds the work power of the supporter that has become a target to be thrown, to the waiting power information 355 of the target. In this example, if a red, blue, or yellow supporter is a target to be thrown, "1" is added, and if a white supporter is a target to be thrown, "10" is added. On the other hand, as a result of the determination in step S86 above, if the cursor 202 is not indicating a "required power set type" work target (NO in step S86), since a "required power non-set type" work target is the target (in this example, the obstacle object), the process in step S87 above is skipped.

Next, in step S88 in FIG. 37, the processor 81 updates the content of the party information 323 such that the remaining number of the type of supporters in the party that are targets to be thrown is decreased by 1. For example, when one red supporter is thrown, the content of the party information 323 of the PC data 302 is updated such that the remaining number of red supporters in the party is decreased by 1 (e.g., the counter indicating the remaining number of red supporters is decreased)

Next, in step S89, the processor 81 refers to the party information 323 and determines whether or not the remaining number of supporters in the party for the current throwing target type has reached 0. As a result of the determination, if the remaining number of supporters has reached 0 (YES in step S89), in step S90, the processor 81 performs automatic switching of the throwing target type. Specifically, the processor 81 selects the next throwing target type on the basis of the predefined order. Then, the processor 81 sets information indicating the selected type, in the center frame information 307 of the throwing target type data 306. In addition, along with this, the processor 81 also updates the right frame information 308 and the left frame information 309.

On the other hand, as a result of the determination, if the above remaining number is not 0 (NO in step S89), the process in step S90 above is skipped. This is the end of the throwing process.

Referring back to FIG. 29, processing in the case where, as a result of the determination in step S13 above, the throwing operation has not been performed, will be described next. In this case, in step S19, the processor 81 determines whether or not the current state is the repeated pressing state and a condition for cancelling the repeated pressing state has been satisfied. That is, the processor 81 determines whether or not the current state is a state immediately after the user stops repeated pressing of the A-button 53. In the exemplary embodiment, if 11 frames or more elapse without any input of the A-button 53 from the previous input of the A-button 53, it is determined that the condition for cancelling the repeated pressing state has been satisfied. As a result of the determination, if the cancelling condition has not been satisfied (NO in step S19), the processor 81 advances the processing to step S17 described later.

Figure 38:
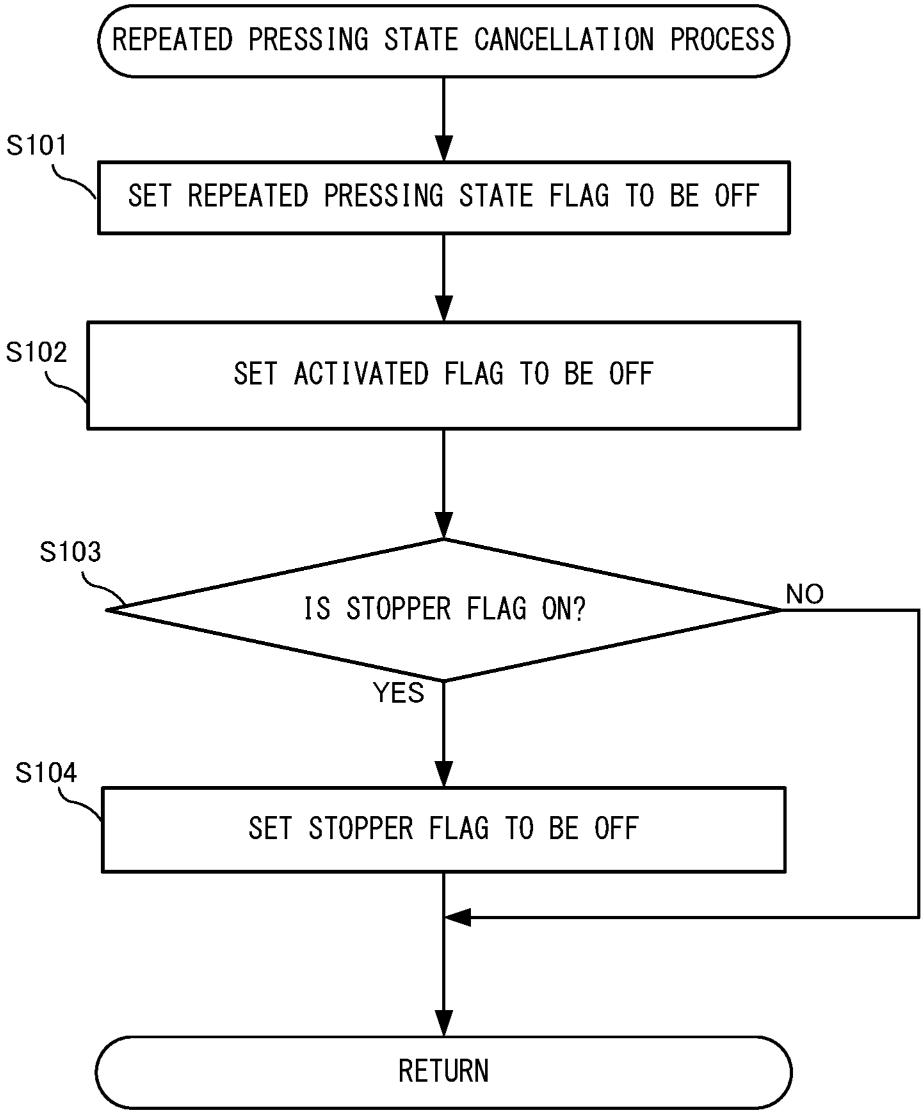
FIG. 38 is a flowchart showing the details of a repeated pressing state cancellation process.

On the other hand, as a result of the determination, if the cancelling condition has been satisfied (YES in step S19), in step S20, the processor 81 executes a repeated pressing state cancellation process. FIG. 38 is a flowchart showing the details of the repeated pressing state cancellation process. In FIG. 38, first, in step S101, the processor 81 sets the repeated pressing state flag 325 to be OFF. Next, in step S102, the processor 81 also sets the activated flag 330 to be OFF. Next, in step S103, the processor 81 determines whether or not the stopper flag 329 is ON. That is, the processor 81 determines whether or not the user has stopped the repeated pressing of the A-button 53 (before 1 second elapses) during stopper activation. If the stopper flag 329 is ON (YES in step S103), in step S104, the processor 81 sets the stopper flag 329 to be OFF. On the other hand, as a result of the determination, if the stopper flag 329 is OFF (NO in step S103), the process in step S104 is skipped. This is the end of the repeated pressing state cancellation process.

Referring back to FIG. 29, next, in step S17, the processor 81 controls the movement of the PC 201 on the basis of the operation data 310. Specifically, the contents of the PC position and orientation information 321 and the PC movement parameter 322 are updated.

Next, in step S18, the processor 81 executes an action control process for the PC 201 other than the above based on the operation data 310. For example, a process for adding a supporter to the party or a process of switching the throwing target type by a manual switching operation is performed. Then, the processor 81 ends the player character control process.

[Action Control for Supporter]

Figure 39:
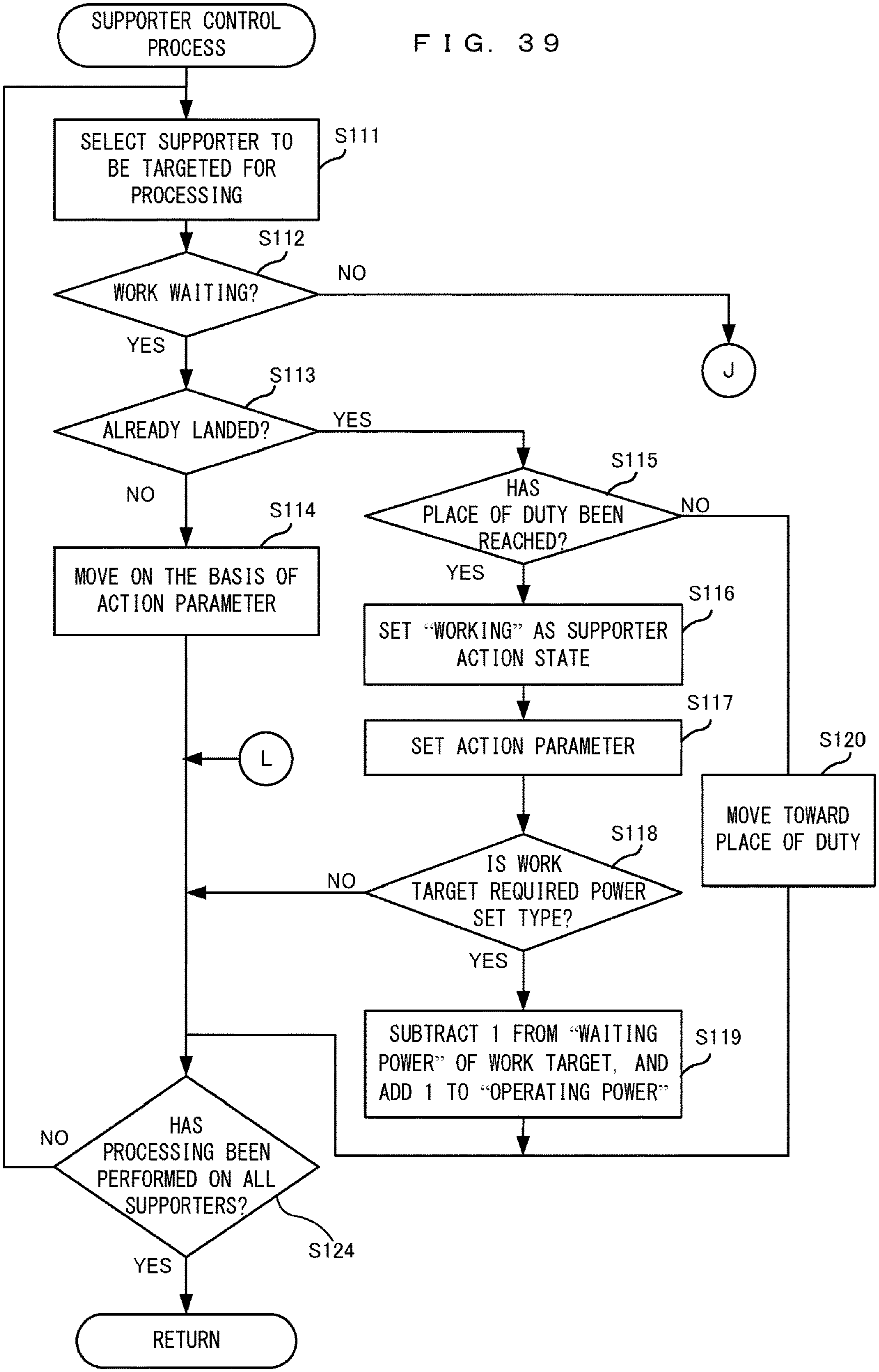
FIG. 39 is a flowchart showing the details of a supporter control process.
Figure 40:
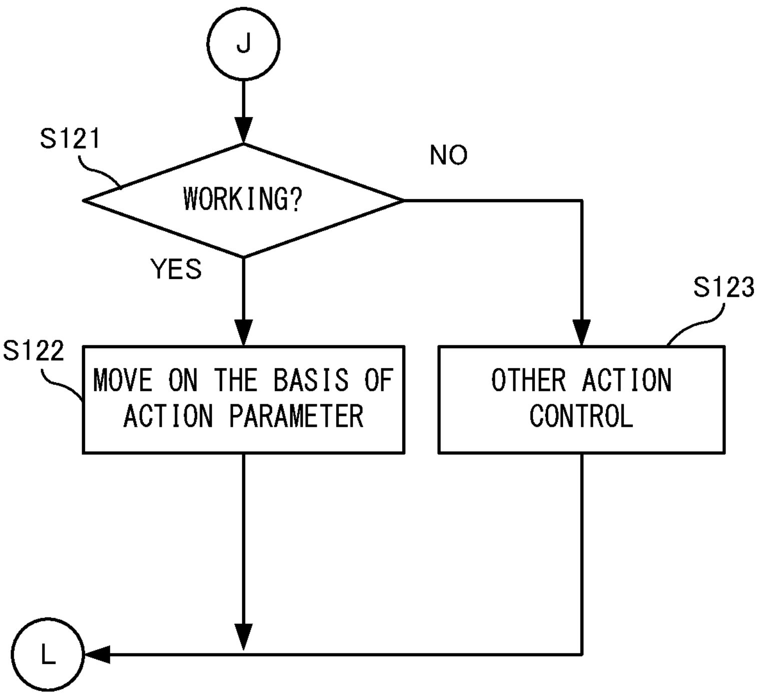
FIG. 40 is a flowchart showing the details of the supporter control process.

Referring back to FIG. 28, next, in step S3, the processor 81 executes a supporter control process. This process is a process for controlling the action of each supporter. FIG. 39 and FIG. 40 are flowcharts showing the details of the supporter control process. In FIG. 39, first, in step S111, the processor 81 selects one supporter to be targeted for the following processing. Hereinafter, the selected supporter is referred to as processing target supporter.

Next, in step S112, the processor 81 determines whether or not the supporter action state 345 of the processing target supporter is "work waiting". If the supporter action state 345 of the processing target supporter is "work waiting" (YES in step S112), in step S113, the processor 81 determines whether or not the processing target supporter has already landed after being thrown, on the basis of the supporter position and orientation information 343 of the processing target supporter, etc. As a result of the determination, if the processing target supporter has not landed yet after being thrown (NO in step S113), in step S114, the processor 81 moves the processing target supporter on the basis of the action parameter 346 of the processing target supporter. In this example, in the action parameter 346, parameters are set such that the processing target supporter moves in a parabolic trajectory while being thrown. Then, the processor 81 advances the processing to step S124 described later.

On the other hand, as a result of the determination in step S113 above, if the processing target supporter has already landed (YES in step S113), in step S115, the processor 81 determines whether or not the processing target supporter has reached the above-described place of duty, on the basis of the supporter position and orientation information 343, etc. If the processing target supporter has not reached the place of duty (NO in step S115), in step S120, the processor 81 moves the processing target supporter toward the place of duty. Then, the processor 81 advances the processing to step S124 described later. On the other hand, if the processing target supporter has reached the place of duty (YES in step S115), in step S116, the processor 81 sets "working" as the supporter action state 345. Next, in step S117, the processor 81 sets the action parameter 346 in accordance with the work target to be targeted for the action of the processing target supporter. For example, if the work target is the above transport body object, the action parameter 346 is set such that the transporting action is performed. In addition, if the work target is the above obstacle object, the action parameter 346 is set such that the destroying action is performed.

Next, in step S118, the processor 81 determines whether or not the work target to be targeted for the action of the processing target supporter is "required power set type". As a result of the determination, if the work target is "required power set type" (YES in step S118), in step S119, the processor 81 subtracts 1 from the waiting power information 355 of the work target and adds 1 to the operating power information 354. On the other hand, as a result of the determination, if the work target is not "required power set type" (NO in step S118), the process in step S119 above is skipped, and the processor 81 advances the processing to step S124 described later.

Next, processing in the case where, as a result of the determination in step S112 above, the supporter action state 345 of the processing target supporter is not "work waiting" (NO in step S112), will be described. In this case, in step S121 in FIG. 40, the processor 81 determines whether or not the supporter action state 345 of the processing target supporter is "working". As a result of the determination, if the supporter action state 345 of the processing target supporter is "working" (YES in step S121), in step S122, the processor 81 controls the action of the processing target supporter on the basis of the action parameter 346 of the processing target supporter. For example, action control for the transporting action or the destroying action is performed. Here, supplementary description will be given regarding the transporting action. If the supporter has reached the place of duty but the required work power has not been satisfied yet, an action of trying to lift the transport body object is performed as part of the transporting action.

On the other hand, as a result of the determination, if the supporter action state 345 of the processing target supporter is not "working" (NO in step S121), in step S123, the processor 81 performs other action control corresponding to the content of the supporter action state 345. For example, if the supporter action state 345 is "waiting", the processor 81 causes the supporter to perform an action of looking around.

Next, in step S124 in FIG. 39, the processor 81 determines whether or not the above processing has been performed on all the supporters. If any supporter on which the above processing has not been performed yet remains (NO in step S124), the processor 81 returns to step S111 above and repeats the processing. If the above processing has been performed on all the supporters (YES in step S124), the processor 81 ends the supporter control process.

[Control for Other Objects]

Referring back to FIG. 28, next, in step S4, the processor 81 controls the actions of various objects other than the PC 201 and the supporters. For example, the processor 81 controls the actions of enemy characters, moves the transport body object along transport thereof, or reproduces an animation showing that the obstacle object is destroyed.

[Setting of Work Power Status Image]

Next, in step S5, the processor 81 updates the display content of the above work power status image 205. This process is executed as appropriate when the work power status image 205 needs to be displayed. In the exemplary embodiment, the work power status image 205 is displayed for a transport body object having a required work power of "2" or more (as described above, such is not displayed for the obstacle object or the transport body object having a required work power of "1"). Therefore, in this process, for such a transport body object, the work power status image 205 is generated on the basis of the required work power information 353 and the operating power information 354, or the display content of the work power status image 205 is updated.

[Output of Game Image]

Next, in step S6, the processor 81 generates a game image reflecting the contents of the processes in step S2 to S5 above, and outputs the game image to the stationary monitor or the like.

Next, in step S7, the processor 81 determines whether or not an end condition for the game processing has been satisfied. For example, the processor 81 determines whether or not a game end instruction operation has been performed by the user. As a result, if the end condition has not been satisfied (NO in step S7), the processor 81 returns to step S2 above and repeats the processing. If the end condition has been satisfied (YES in step S7), the processor 81 ends the game processing.

This is the end of the detailed description of the game processing according to the exemplary embodiment.

As described above, in the exemplary embodiment, for the "required power set type" work target, the action of the PC 201 for throwing is temporarily stopped when the required work power is satisfied (when the throwing operation is performed). In addition, if the repeated pressing continues after that, the throwing action is restarted after 1 second elapses. Therefore, while suppressing throwing for more than the required power, the operability by repeated pressing can be ensured until the required power is satisfied. Accordingly, the operability can be improved.

In addition, for the "type-limited type" work target, when automatic switching of the throwing target type occurs, the action of the PC 201 for throwing is also temporarily stopped. Therefore, it is possible to prevent the user from continuing to throw a supporter due to the momentum of repeated pressing without noticing the occurrence of automatic switching, resulting in throwing even an unuseful supporter (due to momentum) to cause a development disadvantageous to the user. In addition, since the user can perform a repeated pressing operation until automatic switching occurs, the tempo of the operation is not deteriorated. Accordingly, the convenience and the operability of the user can be improved.

Modifications

In the above embodiment, the example in which after the stopper is activated, the stopper is cancelled after 1 second elapses (in the repeated pressing state), has been described. "1 second" is merely an example, and another time may be used, or, for example, an index such as "n frames after the stopper is activated" may be used instead of the number of seconds.

In another exemplary embodiment, after the stopper is activated, the stopper may continue to be activated while the repeated pressing state continues, without cancelling the stopper on the basis of elapse of time. In this case, the stopper may be cancelled as soon as the repeated pressing state ends.

In the above embodiment, as control during stopper activation, the example of control in which the PC 201 is not caused to perform the throwing action has been described. In addition, for example, control in which an input of the A-button 53 itself is not accepted (an input of the A-button 53 is ignored) may be performed. Alternatively, an animation for throwing by the PC 201 may be reproduced, but the PC 201 may not perform actual throwing of a supporter. In this case as well, an uncomfortable feeling can be given to the user, thereby notifying the user about satisfaction of the required power for transport and running out of the remaining number of the throwing target type.

In the above embodiment, the example in which the suspension condition is determined when the stopper is activated due to automatic switching of the throwing target type, has been described. In addition, the example in which the suspension condition is determined on the basis of whether the above-described current target is "type-unlimited type" or "type-limited type", has been described. In addition, the following conditions may be used as the suspension condition. First, the suspension condition may be that the throwing target type is not a specific supporter type. In other words, control in which the stopper is activated when the throwing target type to be thrown next is a specific supporter type, may be performed. For example, although not shown, it is assumed that one special supporter having a work power of "100" is present in the party. Such a special supporter is a supporter that satisfies the required work power of any work target, and has a high influence. Because of the high influence of such a special supporter, it is expected that the user does not want to throw (use) the special supporter lightly. Therefore, regardless of whether the current target is "type-unlimited type" or "type-limited type", the stopper may be activated when the throwing target type is switched to such a special supporter. Accordingly, such a special supporter can be prevented from being thrown against the intention of the user due to the momentum of a repeated pressing operation.

The suspension condition may be another suspension condition that the combination of the throwing target type and the target is a predetermined combination. For example, when the work target is "type-limited type", if the workable type set for the work target does not match the throwing target type when the above automatic switching occurs, the stopper may be activated, and if the workable type matches the throwing target type when the above automatic switching occurs, the stopper may not be activated. In the example of the above electric gate, the result is the same as above, but when automatic switching occurs, it may be determined whether or not the (next) throwing target type is a yellow supporter. The following control may be performed: if the (next) throwing target type is a yellow supporter, it is determined that the suspension condition is satisfied, and the stopper is not be activated, and if the (next) throwing target type is a supporter other than the yellow supporters, it is determined that the suspension condition is not satisfied, and the stopper is activated.

In the above example, the case where all the transport body objects are "type-unlimited type" has been described as an example. In another exemplary embodiment, "type-limited type" transport body objects may be provided. Then, in this case, a stopper based on satisfaction of the above required work power and a stopper due to automatic switching of the throwing target type may coexist. For example, a 'transport body object that can be transported by only red and yellow supporters and that has a required work power of "20"' may be provided. In this case, the stopper may be activated once when the above automatic switching occurs, and then the stopper may be activated for the second time when the required work power is satisfied. Alternatively, only either stopper may be activated.

As for the number of times the stopper is activated due to automatic switching of the throwing target type, in the above embodiment, the example in which the number of times is only one during one repeated pressing period has been described. In another exemplary embodiment, the stopper may be activated not only once, but also may be activated each time automatic switching of the throwing target type occurs during one repeated pressing period.

As for activation of the stopper due to automatic switching of the throwing target type, in the above embodiment, the example in which whether or not to activate the stopper is determined depending on whether the work target is "type-limited type" or "type-unlimited type" has been described. In this regard, in another exemplary embodiment, classification into "type-limited type" and "type-unlimited type" may not necessarily be performed, and the work target corresponding to the above "type-unlimited type" may have an attribute of "stopper invalidity" as described above. That is, control in which even when automatic switching of the throwing target type occurs, if the work target has an attribute of "stopper invalidity", the stopper is not activated, may be performed.

In the above embodiment, the example in which automatic switching of the throwing target type is performed when the remaining number of the current throwing target type reaches 0, and the stopper is activated as necessary, has been described. In another exemplary embodiment, control in which the stopper is activated when the remaining number of the current throwing target type becomes included in a predetermined value range such as "0 to 2" rather than when automatic switching is performed, may be performed. This is useful, for example, for the case where there is a gimmick that allows the PC 201 to temporarily throw two supporters at one time through a single throwing action by using a predetermined item, or the like. In this case, by activating the stopper when the remaining number is about to reach 0, the user can be made to notice that the remaining number of the current throwing target type is small. That is, "awareness" can be given to the user in advance before the remaining number reaches 0.

In the above embodiment, the example in which the work power status image 205 is displayed in the format of "operating power/required work power" has been shown as an example. The display format of the work power status image 205 is not limited to such a format using numerical values, and in another exemplary embodiment, for example, a satisfaction state may be displayed using an indicator, such as a gauge image, for example. Alternatively, a satisfaction number of icon images of supporters that have reached the above place of duty may be displayed without displaying numerical values or an indicator.

In the above embodiment, the operation of repeatedly pressing the A-button 53 is exemplified as an example of the operation for repeating the above throwing operation. The operation for repeating the above throwing operation is not limited to such a button operation, and the above processing can also be applied to the case of repeated input by an input method using a motion sensor. In this case, for example, an operation of shaking the controller once may be used instead of a single button operation.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a user's operation to a predetermined server, and the server may be configured to execute various kinds of game processing and stream the execution results as video/audio to the main body apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A computer-readable non-transitory storage medium having stored therein instructions that, when executed by a computer of an information processing apparatus, cause the computer of the information processing apparatus to:

detect that a first input operation has been performed by a user;

perform an event occurrence process of causing an event to occur each time the first input operation is performed once;

perform a parameter change process of changing a parameter each time the event occurs;

generate a display image including an image corresponding to the parameter; and temporarily stop and then restart the event occurrence process if the parameter becomes included in a reference range when the first input operation is repeatedly performed a plurality of times by the user.

2. The storage medium according to claim 1, wherein the parameter is changed such that an amount by which the parameter is changed may be different for each occurrence of the event.

3. The storage medium according to claim 1, wherein the display image including an index in which a change in the parameter is reflected with a delay is generated.

4. The storage medium according to claim 1, wherein, when the first input operation is repeatedly performed a plurality of times by the user, if the parameter becomes included in the reference range, the event occurrence process is stopped for a certain time and then restarted.

5. The storage medium according to claim 4, wherein, after the first input operation is performed, when the first input operation is performed again within a time equal to or less than a threshold, it is determined that the first input operation is repeatedly performed a plurality of times.

6. The storage medium according to claim 1, wherein, when the first input operation is repeatedly performed a plurality of times by the user, if the parameter becomes included in the reference range, the event occurrence process is stopped until the first input operation is no longer repeated, and is then restarted.

7. The storage medium according to claim 1, wherein, when the repeat of the first input operation by the user stops while the event occurrence process is temporarily stopped, a time for which the event occurrence process is temporarily stopped is shortened.

8. The storage medium according to claim 1, wherein the instructions further cause the computer to:

place a target object with which the parameter and the reference range are associated with, in a virtual space; and change a visual state of the target object as the event each time the first input operation is performed.

9. The storage medium according to claim 8, wherein the event is caused to occur by causing a player object to perform an action for the target object each time the first input operation is performed, and while the event occurrence process is temporarily stopped, causing the player object to perform the action for the target object in accordance with the first input operation being performed is temporarily stopped.

10. The storage medium according to claim 8, wherein the instructions further cause the computer to:

move a cursor indicating a position in the virtual space, in accordance with a second input operation being performed by the user;

fix the cursor such that the cursor indicates a position of the target object, in accordance with a cursor fixing condition being satisfied; and cause the event to occur at the position in the virtual space indicated by the cursor each time the first input operation is performed.

11. The storage medium according to claim 10, wherein, when the cursor is fixed so as to indicate the position of the target object and another target object is present near the target object, if the parameter becomes included in the reference range, the cursor is fixed so as to indicate a position of the other target object, and the player object is caused to perform the action for the other target object each time the first input operation is performed, without temporarily stopping the event occurrence process.

12. The storage medium according to claim 11, wherein the parameter associated with the target object becomes included in the reference range in accordance with the event occurring once.

13. The storage medium according to claim 8, wherein a character object is placed in the virtual space each time the first input operation is performed by the user, and if the parameter becomes included in the reference range, the target object is moved by the character object.

14. The storage medium according to claim 13, wherein a process of causing the character object, which is placed in the virtual space each time the first input operation is performed by the user, to perform an action on the target object after a waiting time elapses, is performed, and the parameter is changed before the action is started.

15. An information processing apparatus comprising a processor and a memory coupled thereto, the processor being configured to control the information processing apparatus to at least:

detect that a first input operation has been performed by a user;

perform an event occurrence process of causing an event to occur each time the first input operation is performed once;

perform a parameter change process of changing a parameter each time the event occurs;

generate a display image including an image corresponding to the parameter; and when performing the event occurrence process, temporarily stop and then restart the event occurrence process if the parameter becomes included in a reference range when the first input operation is repeatedly performed a plurality of times by the user.

16. An information processing system comprising a processor and a memory coupled thereto, the processor being configured to control the information processing system to at least:

detect that a first input operation has been performed by a user;

perform an event occurrence process of causing an event to occur each time the first input operation is performed once;

perform a parameter change process of changing a parameter each time the event occurs;

generate a display image including an image corresponding to the parameter; and when performing the event occurrence process, temporarily stop and then restart the event occurrence process if the parameter becomes included in a reference range when the first input operation is repeatedly performed a plurality of times by the user.

17. An information processing method executed by a computer of an information processing apparatus, the information processing method causing the computer to:

detect that a first input operation has been performed by a user;

perform an event occurrence process of causing an event to occur each time the first input operation is performed once;

perform a parameter change process of changing a parameter each time the event occurs;

generate a display image including an image corresponding to the parameter; and when performing the event occurrence process, temporarily stop and then restart the event occurrence process if the parameter becomes included in a reference range when the first input operation is repeatedly performed a plurality of times by the user.

* * * * *